US010851855B2

(12) United States Patent
Matsuura et al.

(10) Patent No.: US 10,851,855 B2
(45) Date of Patent: Dec. 1, 2020

(54) CLUTCH CONTROL DEVICE

(71) Applicant: HONDA MOTOR CO., LTD., Tokyo (JP)

(72) Inventors: Kohei Matsuura, Wako (JP); Junya Ono, Wako (JP); Tatsuya Ryuzaki, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 16/198,918

(22) Filed: Nov. 23, 2018

(65) Prior Publication Data
US 2019/0162252 A1 May 30, 2019

(30) Foreign Application Priority Data

Nov. 27, 2017 (JP) .................................. 2017-226776

(51) Int. Cl.
*F16D 48/06* (2006.01)
*B62K 23/06* (2006.01)

(52) U.S. Cl.
CPC ........... *F16D 48/066* (2013.01); *F16D 48/06* (2013.01); *B62K 23/06* (2013.01); *F16D 2500/1026* (2013.01); *F16D 2500/50203* (2013.01); *F16D 2500/70626* (2013.01)

(58) Field of Classification Search
None
See application file for complete search history.

(56) References Cited

U.S. PATENT DOCUMENTS

| 5,439,428 A * | 8/1995 | Slicker .................... F16D 48/06 477/175 |
| 5,819,585 A | 10/1998 | Darnell |
| 2008/0026910 A1 | 1/2008 | Honma et al. |
| 2013/0245901 A1* | 9/2013 | Arai ........................ F16D 48/08 701/51 |
| 2014/0195129 A1* | 7/2014 | Hultengren ............. F16D 13/00 701/54 |

(Continued)

FOREIGN PATENT DOCUMENTS

| CN | 1113194 | 12/1995 |
| CN | 1211695 | 3/1999 |
| CN | 1532438 | 9/2004 |

(Continued)

OTHER PUBLICATIONS

Extended European Search Report for European Patent Application No. 18208242.0 dated Sep. 13, 2019.

(Continued)

*Primary Examiner* — Justin Holmes
(74) *Attorney, Agent, or Firm* — Amin, Turocy & Watson, LLP

(57) ABSTRACT

A clutch control device includes an ECU that controls a clutch actuator, the ECU sets a control target value of the clutch capacity according to the operation amount detected by the clutch operation amount sensor, and executes feedback control so that the control parameter which is detected by the control parameter sensor approaches the control target value, and changes a method of the feedback control when the control parameter reaches a predetermined control state change determination value during the feedback control.

7 Claims, 16 Drawing Sheets

(56) References Cited

U.S. PATENT DOCUMENTS

2017/0198764 A1* 7/2017 Miyazono ............... F16D 48/06
2018/0106305 A1 4/2018 Baehr et al.

FOREIGN PATENT DOCUMENTS

| | | |
|---|---|---|
| CN | 103883642 | 6/2014 |
| DE | 102015204282 | 9/2016 |
| DE | 102015204383 | 9/2016 |
| EP | 2233766 | 9/2010 |
| GB | 9505174 | 5/1995 |
| JP | 02-031067 | 2/1990 |
| JP | 03-125030 | 5/1991 |
| JP | 09-210092 | 8/1997 |
| JP | 2004-028159 | 1/2004 |
| JP | 2008-032185 | 2/2014 |
| JP | 2014-070681 | 4/2014 |
| JP | 2017-166686 | 9/2017 |

OTHER PUBLICATIONS

Chinese Office Action for Chinese Patent Application No. 201811403387.X dated Jan. 23, 2020.
Japanese Office Action for Japanese Patent Application No. 2017-226776 dated Sep. 29, 2020.

* cited by examiner

CLUTCH CONTROL DEVICE

CROSS-REFERENCE TO RELATED APPLICATION

Priority is claimed on Japanese Patent Application No. 2017-226776, filed Nov. 27, 2017, the content of which is incorporated herein by reference.

BACKGROUND OF THE INVENTION

Field of the Invention

The present invention relates to a clutch control device.

Description of Related Art

In the related art, a configuration in which an intervention of a manual operation with a clutch lever during automated control of a clutch by an actuator is possible is known (for example, see Japanese Unexamined Patent Application, First Publication No. 2014-070681).

In Japanese Unexamined Patent Application, First Publication No. 2014-070681, in order to smoothly perform an intervention of a manual operation during automated control of a clutch, in a state in which a difference between calculation results of a clutch capacity during automated control and a clutch capacity during a manual operation is large, switching to a calculated value of the clutch capacity during the manual operation is prevented and abrupt variation of the clutch capacity is avoided, and thereby, it is made possible to perform an intervention of the manual operation without causing an unease.

SUMMARY OF THE INVENTION

Incidentally, in the related art, a connection performance (responsiveness) when the clutch is reconnected after an intervention (a clutch disconnection operation) of a manual operation with a clutch lever is not mentioned.

Especially, when the actuator is feedback controlled, if same controls are executed before and after of the clutch connection, there is a case in which the delay occurs in the clutch connection or difference from the control target value gets extremely large.

In addition, it is also necessary to consider a case in which friction (a flow resistance or pressure loss in an oil passage) is present in a hydraulic path of a clutch operation system.

An aspect of the present invention is directed to optimize the feedback control of an actuator in a clutch control device in which a manual operation of the clutch can be performed via the actuator.

(1) A clutch control device according to an aspect of the present invention includes an engine; a gearbox; a clutch device that disconnects and connects a power transmission between the engine and the gearbox; a clutch actuator that drives the clutch device and changes a clutch capacity; a controller that calculates a control target value of the clutch capacity; a control parameter sensor that detects a control parameter of the clutch capacity; a clutch operator that manually operates the clutch device; and a clutch operation amount sensor that converts an operation amount of the clutch operator into an electrical signal, wherein the controller sets a control target value of the clutch capacity according to the operation amount detected by the clutch operation amount sensor, executes feedback control so that the control parameter which is detected by the control parameter sensor approaches the control target value, and changes a method of the feedback control when the control parameter reaches a predetermined control state change determination value during the feedback control.

(2) In the aspect of above mentioned (1), the controller may perform the feedback control on the basis of an I term in a PID control before the control parameter reaches the control state change determination value, and may perform the feedback control on the basis of a P term in the PID control after the control parameter reaches the control state change determination value.

(3) In the aspect of above mentioned (1) or (2), the clutch device may switch whether to perform the power transmission or not to perform the power transmission when the control parameter reaches the control state change determination value.

(4) In the aspect of any one of above mentioned (1) to (3), the controller may calculate a clutch operation speed on the basis of an operation amount detected by the clutch lever operation amount sensor, and may vary the control state change determination value according to the clutch operation speed.

(5) In the aspect of any one of above mentioned (1) to (4), the clutch capacity may be controlled by the hydraulic pressure, a master cylinder of the clutch actuator and a slave cylinder of the clutch device may be connected to each other via a hydraulic pressure pipeline, and the control parameter sensor that is a slave hydraulic pressure sensor may be disposed in the hydraulic pressure pipeline.

(6) In the aspect of above mentioned (5), when the hydraulic pressure decreases the clutch capacity decreases and the clutch device may be disconnected.

(7) In the aspect of any one of above mentioned (1) to (6), the clutch operator may be a clutch lever, and the clutch operation amount sensor may detect a pivot angle of the clutch lever.

According to the aspect of above mentioned (1), since the method of the feedback control is changed when the control parameter of the clutch capacity reaches the control state change determination value, for example, controls which are appropriate for the stroke region before reaching the control state change determination value and for the load control region after reaching the control state change determination value can be performed. For this reason, it is possible to improve connection performance of the clutch device by quickening the convergence of the control parameter. In addition, since the control state change determination value is set on the basis of the clutch operation amount, for example, even when the oil path pressure loss extent of the clutch operation system is affected, connection performance of the clutch device can be improved similarly.

According to the aspect of above mentioned (2), since weighting of each terms of the PID control of the clutch actuator is varied before and after the control parameter of the clutch capacity reaches the control state change determination value, appropriate feedback control can be performed. Specifically, the feedback control can be performed using the I term (integral term) main before the control parameter reaches the control state change determination value, and the feedback control can be performed using the P term (deviation term) main after the control parameter reaches the control state change determination value. For this reason, the convergence of the control parameter can be accelerated in the load control region in a later stage of the clutch operation while quickening a clutch stroke in the stroke region at the beginning of the clutch operation.

According to the aspect of above mentioned (3), since the method of the feedback control is changed at a touch point at which it is switched whether to perform the power transmission or not to perform the power transmission, the feedback control can be changed according to the state variation of the clutch device, and it is possible to accelerate the convergence of the control parameter while suppressing overshoot or hunting of the control parameter.

According to the aspect of above mentioned (4), since the control state change determination value is varied depending on the clutch operation speed (the lever operation speed), for example, even when the oil path pressure loss extent of the clutch operation system is affected, it is possible to vary the control state change determination value while considering the loss extent. For this reason, it is possible to accurately change the feedback control at the touch point at which it is switched whether the clutch device performs the power transmission or not to perform the power transmission.

According to the aspect of above mentioned (5), it is possible to increase a degree of disposition freedom of the slave hydraulic pressure sensor, and even when the slave hydraulic pressure sensor and the slave cylinder are disposed at places separated from each other, it is possible to accurately control the clutch capacity.

According to the aspect of above mentioned (6), even when there is a delay of transmission of a hydraulic pressure between the clutch actuator and the clutch device due to a flow resistance (pressure loss) of the hydraulic pressure, working responsiveness of the clutch device can be increased.

According to the aspect of above mentioned (7), a timing when a user requires disconnection and connection of the clutch can be stably and accurately detected.

DETAILED DESCRIPTION OF THE INVENTION

Figure 1:
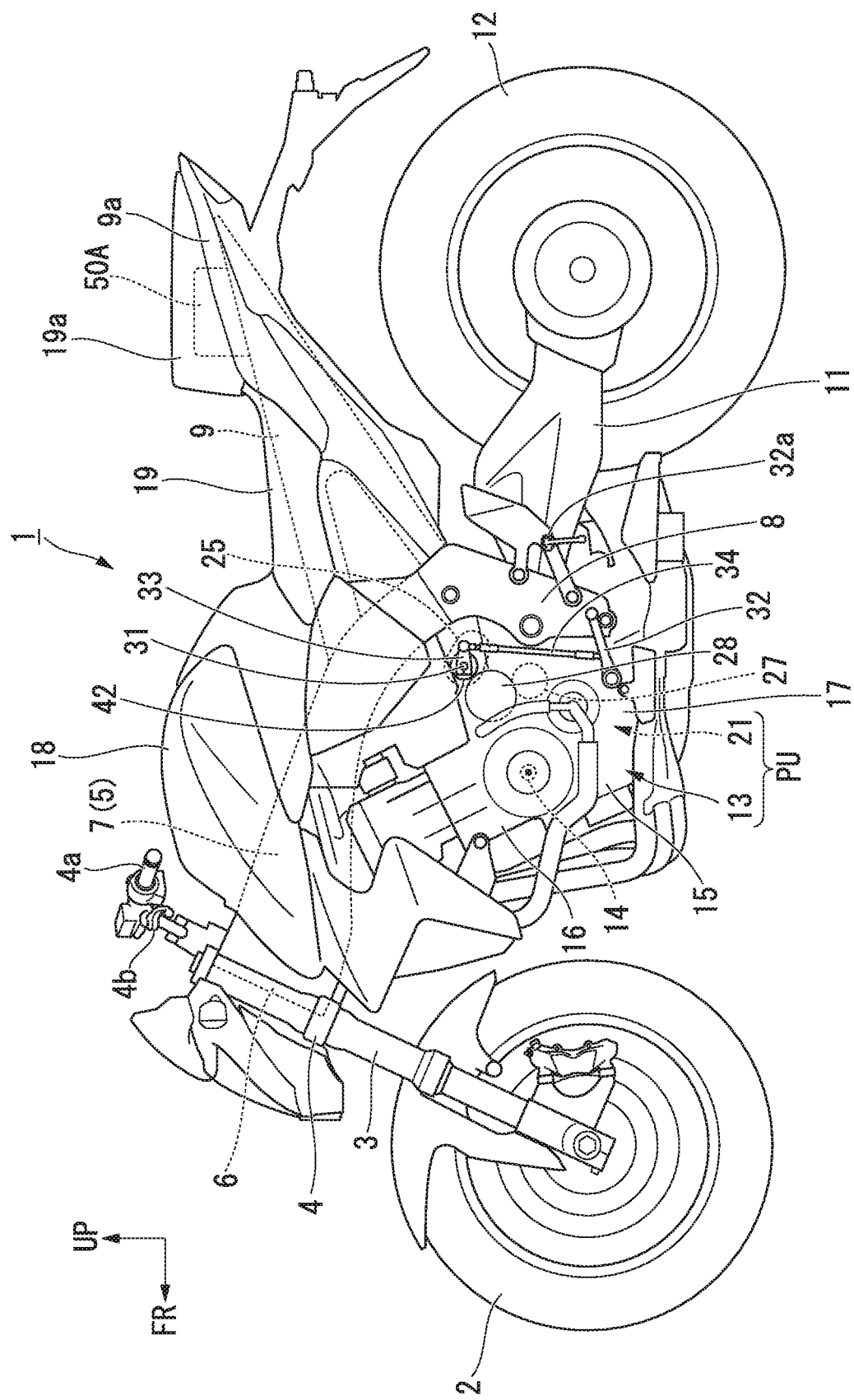
FIG. 1 is a left side view of a motorcycle of the embodiment.

Hereinafter, an embodiment of the present invention will be described with reference to the accompanying drawings. Further, directions of forward and rearward, leftward and rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

As shown in FIG. 1, the embodiment is applied to a motorcycle 1 that is a saddle riding vehicle. A front wheel 2 of the motorcycle 1 is supported by lower end portions of a pair of left and right front forks 3.

Upper sections of the left and right front forks 3 are supported by a head pipe 6 provided at a front end portion of a vehicle body frame 5 via a steering stem 4. A bar type steering handle 4a is attached onto a top bridge of the steering stem 4.

The vehicle body frame 5 includes the head pipe 6, main tubes 7 extending downward and rearward from the head pipe 6 at a center in a vehicle width direction (a leftward and rightward direction), left and right pivot frames 8 that are connected to the lower sides of rear end portions of the main tubes 7, and a seat frame 9 that is connected to rear sides of the main tubes 7 and the left and right pivot frames 8. A front end portion of a swing arm 11 is swingably supported by the left and right pivot frames 8. A rear wheel 12 of the motorcycle 1 is supported by a rear end portion of the swing arm 11.

A fuel tank 18 is supported above the left and right main tubes 7. A front seat 19 and a rear seat cover 19a that are arranged in a forward and rearward direction are supported at behind the fuel tank 18 and above the seat frame 9. The surroundings of the seat frame 9 are covered with a rear cowl 9a.

A power unit PU that is a prime mover of the motorcycle 1 is suspended below the left and right main tubes 7. The power unit PU is linked to the rear wheel 12 via, for example, a chain type transmission mechanism.

The power unit PU integrally has a gearbox 21 disposed behind an engine (an internal combustion engine) 13 disposed in front of the power unit PU. The engine 13 is, for example, a multiple-cylinder engine in which a rotation axis of a crankshaft 14 is in the leftward and rightward direction (the vehicle width direction). In the engine 13, a cylinder 16 stands up at a front upper side of a crankcase 15. A rear section of the crankcase 15 is a gearbox case 17 that accommodates the gearbox 21.

<Gearbox>

Figure 2:
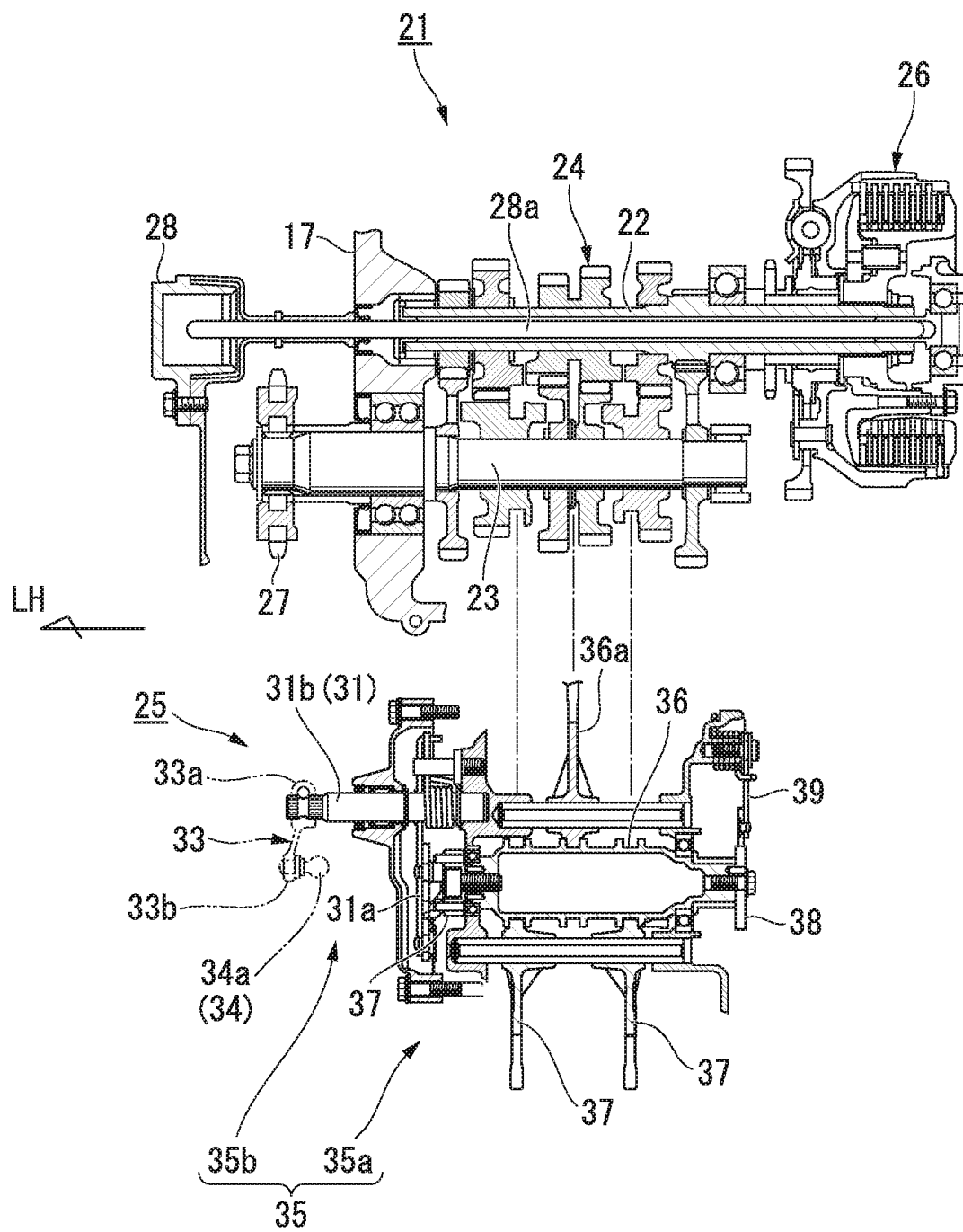
FIG. 2 is a cross-sectional view of a gearbox and a change mechanism of the motorcycle.

As shown in FIG. 2, the gearbox 21 is a stepped transmission having a main shaft 22, a counter shaft 23, and a shifting gear group 24 that bridges both of the shafts 22 and 23. The counter shaft 23 constitutes output shafts of the gearbox 21 and the power unit PU. An end portion of the counter shaft 23 protrudes from a rear left side of the crankcase 15, and is connected to the rear wheel 12 via the chain type transmission mechanism.

The shifting gear group 24 has gears corresponding to the number of variable speed levels supported by the shafts 22 and 23. The gearbox 21 is of a constant mesh type in which gear pairs to which the shifting gear group 24 corresponds are normally meshed between the shafts 22 and 23. A plurality of gears supported by the shafts 22 and 23 are classified into a free gear that is rotatable with respect to a corresponding shaft, and a slide gear (a shifter) spline-fitted to a corresponding shaft. A convex dog is formed on one of the free gear and the slide gear in an axial direction, and a concave slot is formed in the other gear in the axial direction such that the dog is engaged with the slot. That is, the gearbox 21 is a so-called dog mission.

Figure 3:
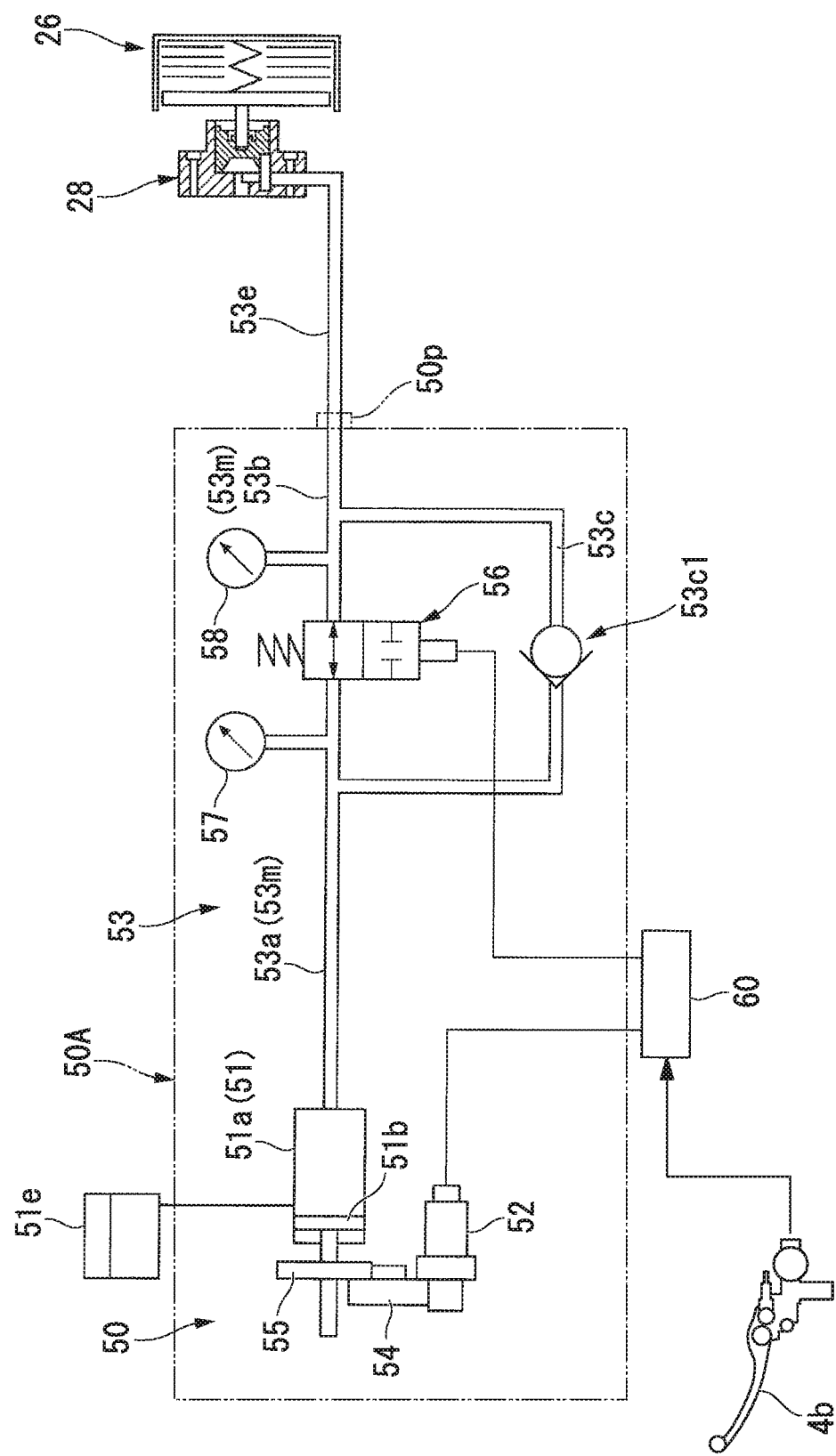
FIG. 3 is a view for schematically explaining a clutch operating system including a clutch actuator.

Referring also to FIG. 3, the main shaft 22 and the counter shaft 23 of the gearbox 21 are disposed behind the crankshaft 14 in the forward and rearward direction. A clutch device 26 operated by a clutch actuator 50 is disposed coaxially with a right end portion of the main shaft 22. The clutch device 26 is, for example, a wet multiplate clutch that is a so-called normal open clutch. That is, the clutch device 26 is in a connection state in which power transmission is possible due to supply of a hydraulic pressure from the clutch actuator 50, and returns to a disconnection state in which power transmission is not possible when there is no supply of a hydraulic pressure from the clutch actuator 50.

Referring to FIG. 2, the rotary power of the crankshaft 14 is transmitted to the main shaft 22 via the clutch device 26, and transmitted from the main shaft 22 to the counter shaft 23 via an arbitrary gear pair of the shifting gear group 24. A drive sprocket 27 of the chain type transmission mechanism is attached to a left end portion of the counter shaft 23 protruding toward a rear left side of the crankcase 15. A change mechanism 25 configured to switch a gear pair of the shifting gear group 24 is accommodated in the gearbox 21 on a rear upper side thereof. The change mechanism 25 operates a plurality of shift forks 36a according to a pattern of lead grooves formed in an outer circumference thereof due to rotation of a hollow cylindrical shift drum 36 parallel to both of the shafts 22 and 23, and switches a gear pair of the shifting gear group 24 used for power transmission between the shafts 22 and 23.

The change mechanism 25 has a shift spindle 31 parallel to the shift drum 36.

Upon rotation of the shift spindle 31, a shift arm 31a fixed to the shift spindle 31 rotates the shift drum 36, moves the shift forks 36a according to a pattern of the lead groove in the axial direction, and switches a gear pair that enables power transmission in the shifting gear group 24 (i.e., a variable speed level is switched).

The shift spindle 31 has a shaft outer portion 31b protruding outward (leftward) from the crankcase 15 in the vehicle width direction such that the change mechanism 25 is operable. A shift load sensor 42 (a shift operation detection means) is coaxially attached to the shaft outer portion 31b of the shift spindle 31 (see FIG. 1). A swing lever 33 is attached to the shaft outer portion 31b of the shift spindle 31 (or a rotation axis of the shift load sensor 42). The swing lever 33 extends rearward from a base end portion 33a fixed to the shift spindle 31 (or a rotation axis) using a clamp, and an upper end portion of a link rod 34 is swingably connected to a tip portion 33b of the swing lever 33 via an upper ball joint 34a. A lower end portion of the link rod 34 is swingably connected to a shift pedal 32 that is operated by a driver's foot via a lower ball joint (not shown).

As shown in FIG. 1, the shift pedal 32 has a front end portion that is vertically swingably supported by a lower section of the crankcase 15 via a shaft in the leftward and rightward direction. A pedal section on which a tip of a driver's foot placed on a step 32a is put is installed on a rear end portion of the shift pedal 32, and a lower end portion of the link rod 34 is connected to an intermediate section of the shift pedal 32 in the forward and rearward direction.

As shown in FIG. 2, a shift change apparatus 35 including the shift pedal 32, the link rod 34 and the change mechanism 25 and configured to switch a variable speed level gear of the gearbox 21 is provided. In the shift change apparatus 35, an assembly (the shift drum 36, the shift forks 36a, and so on) configured to switch a variable speed level of the gearbox 21 is referred to as a transmission working part 35a, and the assembly (the shift spindle 31, the shift arm 31a, and so on) into which a shifting operation to the shift pedal 32 is input and configured to rotate about a shaft of the shift spindle 31 and transmit the rotation to the transmission working part 35a is referred to as a shifting operation receiving part 35b.

Here, the motorcycle 1 employs a so-called semi-automatic gear shift system (an automatic clutch type gear shift system) in which a driver performs only a shifting operation of the gearbox 21 (a foot operation of the shift pedal 32), and a disconnection and connection operation of the clutch device 26 is automatically performed through electric control according to an operation of the shift pedal 32.

<Gear Shift System>

Figure 4:
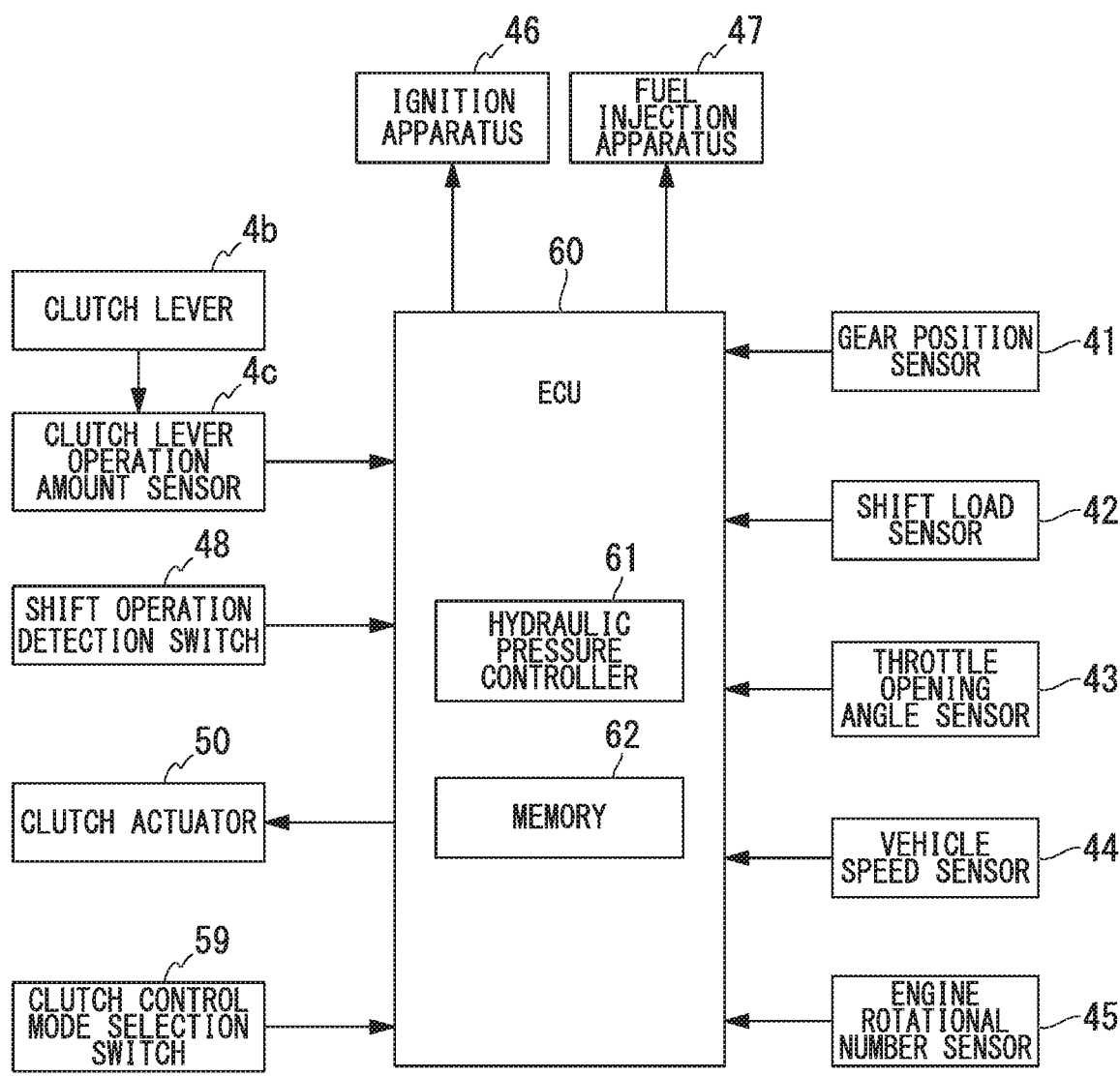
FIG. 4 is a block diagram of a gear shift system.

As shown in FIG. 4, the gear shift system includes the clutch actuator 50, an electronic control unit 60 (ECU, a control device) and various sensors 41 to 45.

The ECU 60 controls operations of an ignition apparatus 46 and a fuel injection apparatus 47 while controlling an operation of the clutch actuator 50 on the basis of detection information from a gear position sensor 41 configured to detect a variable speed level from a rotation angle of the shift drum 36 and a shift load sensor (for example a torque sensor) 42 configured to detect an operation torque input to the shift spindle 31, and various types of vehicle state detection information or the like from a throttle opening angle sensor 43, a vehicle speed sensor 44, an engine rotational speed sensor 45, and so on. Detection information from hydraulic pressure sensors 57 and 58, and a shift operation detection switch (a shift neutral switch) 48, which will be described below, is also input to the ECU 60.

The ECU 60 includes a memory 62 such as a read only memory (ROM), a random access memory (RAM), or the like, in addition to a central processing unit (CPU).

In addition, the ECU 60 includes a hydraulic pressure controller (a clutch controller) 61, a function of which will be described below.

Referring also to FIG. 3, the clutch actuator 50 can control a liquid pressure that disconnects and connects the clutch device 26 by controlling an operation thereof using the ECU 60. The clutch actuator 50 includes an electric motor 52 (hereinafter, simply referred to as the motor 52) serving as a drive source, and a master cylinder 51 driven by the motor 52. The clutch actuator 50 constitutes an integrated clutch controller 50A together with a hydraulic pressure circuit apparatus 53 installed between the master cylinder 51 and a hydraulic pressure supply/discharge port 50p.

The ECU 60 calculates a target value (a target hydraulic pressure) of a hydraulic pressure supplied to a slave cylinder 28 for disconnecting and connecting the clutch device 26 on the basis of a preset calculation program, and controls the clutch controller 50A such that a hydraulic pressure (a slave hydraulic pressure) on the side of the slave cylinder 28 detected by the downstream-side hydraulic pressure sensor 58 approaches a target hydraulic pressure.

The master cylinder 51 can stroke a piston 51b in a cylinder main body 51a through driving of the motor 52, and working oil in the cylinder main body 51a can be supplied to or discharged from the slave cylinder 28. Reference numeral 55 in the drawings designates a ball screw mechanism serving as a conversion mechanism, reference numeral 54 designates a transmission mechanism that bridges between the motor 52 and the conversion mechanism 55, and reference numeral 51e designates a reservoir connected to the master cylinder 51.

The hydraulic pressure circuit apparatus 53 has a valve mechanism (a solenoid valve 56) configured to open or block an intermediate area of a main oil path (a hydraulic pressure supply/discharge oil path) 53m extending from the master cylinder 51 toward the clutch device 26 (the slave cylinder 28). The main oil path 53m of the hydraulic pressure circuit apparatus 53 is divided into an upstream side oil path 53a which is at the master cylinder 51 side with respect to the solenoid valve 56 and a downstream side oil path 53b which is at the slave cylinder 28 side with respect to the solenoid valve 56. The hydraulic pressure circuit apparatus 53 further includes a bypass oil path 53c configured to bypass the solenoid valve 56 and to communicate the upstream side oil path 53a and the downstream side oil path 53b.

The solenoid valve 56 is a so-called normal open valve. A one-way valve 53c1 configured to allow working oil to flow only in a direction from an upstream side to a downstream side is installed in the bypass oil path 53c. The upstream-side hydraulic pressure sensor 57 configured to detect a hydraulic pressure of the upstream side oil path 53a is installed at the upstream of the solenoid valve 56. The downstream-side hydraulic pressure sensor 58 configured to detect a hydraulic pressure of the downstream side oil path 53b is installed at the downstream of the solenoid valve 56.

As shown in FIG. 1, the clutch controller 50A is accommodated in, for example, the rear cowl 9a. The slave cylinder 28 is attached to a rear left side of the crankcase 15. The clutch controller 50A and the slave cylinder 28 are connected to each other via a hydraulic pressure pipeline 53e (see FIG. 3).

As shown in FIG. 2, the slave cylinder 28 is disposed coaxially with the main shaft 22 on a left side thereof. The slave cylinder 28 presses a push rod 28a passing through the main shaft 22 rightward when a hydraulic pressure from the clutch actuator 50 is supplied. The slave cylinder 28 operates the clutch device 26 into a connection state via the push rod 28a by pressing the push rod 28a rightward. The slave cylinder 28 releases pressing of the push rod 28a and returns the clutch device 26 to a disconnection state when there is no supply of the hydraulic pressure.

While a hydraulic pressure needs to be continuously supplied to maintain the clutch device 26 in a connection state, electric power is correspondingly consumed. Here, as shown in FIG. 3, the solenoid valve 56 is installed in the hydraulic pressure circuit apparatus 53 of the clutch controller 50A, and the solenoid valve 56 is closed after supply of a hydraulic pressure toward the clutch device 26. Accordingly, energy consumption is minimized by a configuration of maintaining a hydraulic pressure at the clutch device 26 side and supplementing the hydraulic pressure according to decrease in pressure (recharging a pressure according to an amount of leakage).

<Clutch Control>

Figure 5:
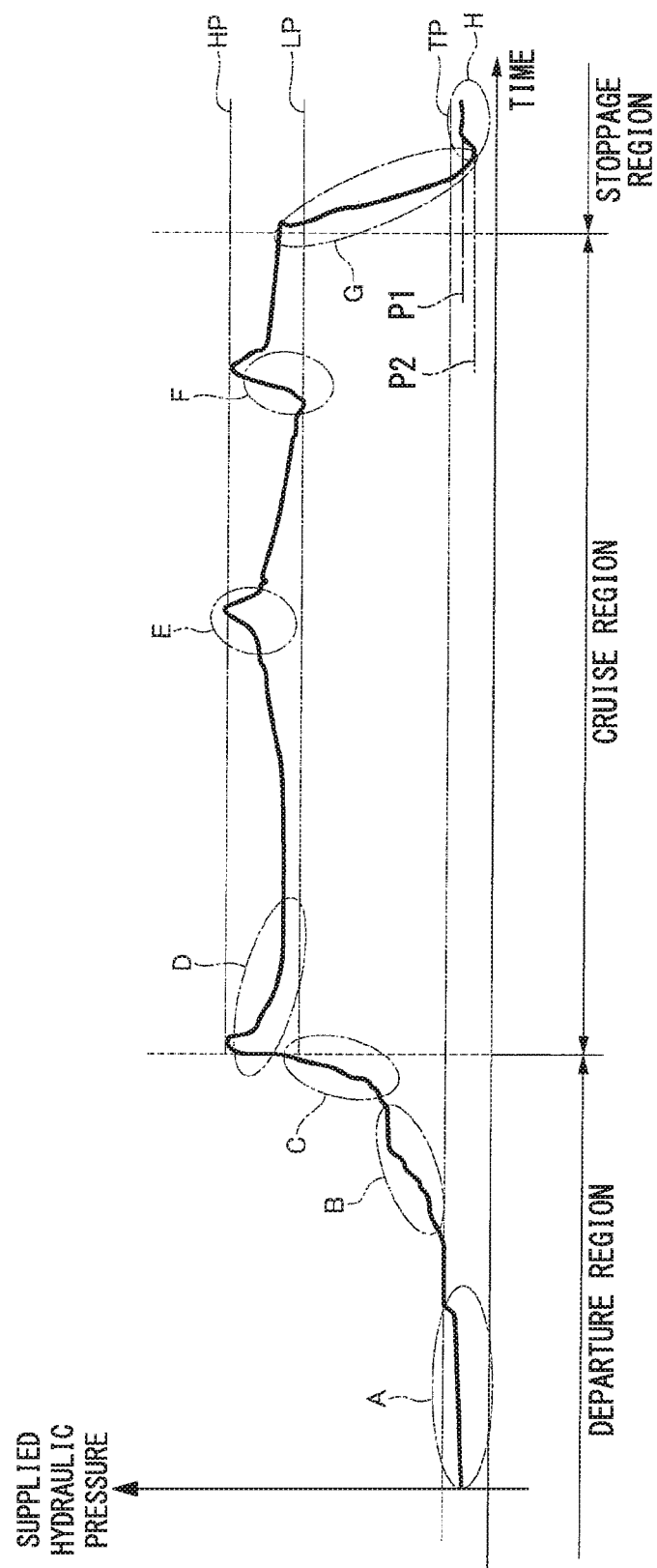
FIG. 5 is a graph showing variation in supplied hydraulic pressure of the clutch actuator.

Next, an action of a clutch control system will be described with reference to a graph of FIG. 5. In the graph of FIG. 5, a vertical axis represents a supplied hydraulic pressure detected by the downstream-side hydraulic pressure sensor 58, and a lateral axis represents an elapsed time.

Upon stoppage (upon idling) of the motorcycle 1, both of the motor 52 and the solenoid valve 56 controlled by the ECU 60 are in a state in which supply of electric power is cut off. That is, the motor 52 is in a stopped state, and the solenoid valve 56 is in an open state. Here, the slave cylinder 28 side (a downstream side) is in a state of having a pressure lower than a touch point hydraulic pressure TP, and the clutch device 26 is in a disengaged state (a disconnection state, a release state). This state corresponds to a region A in FIG. 5.

Upon departure of the motorcycle 1, when a rotational number of the engine 13 is increased, electric power is supplied only to the motor 52, and a hydraulic pressure is supplied from the master cylinder 51 to the slave cylinder 28 via the solenoid valve 56 in an open state. When a hydraulic pressure on a side of the slave cylinder 28 (a downstream side) is increased to the touch point hydraulic pressure TP or more, engagement of the clutch device 26 is started, and the clutch device 26 becomes in a half clutch state in which some of power can be transmitted. Accordingly, smooth departure of the motorcycle 1 becomes possible. This state corresponds to a region B in FIG. 5.

Then, when a difference between input rotation and output rotation of the clutch device 26 is reduced and a hydraulic pressure on a side of the slave cylinder 28 (the downstream side) reaches a lower limit holding hydraulic pressure LP, engagement of the clutch device 26 is shifted to a locked state, and a driving force of the engine 13 is entirely transmitted to the gearbox 21. This state corresponds to a region C in FIG. 5.

When a hydraulic pressure is supplied from the master cylinder 51 side toward the slave cylinder 28, the solenoid valve 56 is in an open state, the motor 52 is energized to drive in a normal rotation direction, and the master cylinder 51 is pressurized. Accordingly, a hydraulic pressure on a side of the slave cylinder 28 is adjusted to a clutch-engagement hydraulic pressure. Here, driving of the clutch actuator 50 is feedback-controlled on the basis of a detected hydraulic pressure of the downstream-side hydraulic pressure sensor 58.

Then, when a hydraulic pressure on the side of the slave cylinder 28 (the downstream side) reaches an upper limit holding hydraulic pressure HP, electric power is supplied to the solenoid valve 56 to close the solenoid valve 56, and simultaneously, supply of electric power to the motor 52 is stopped and generation of a hydraulic pressure is stopped. That is, when the upstream side is in a low pressure state since the hydraulic pressure has been released, on the other hand, the downstream side is maintained in a high pressure state (the upper limit holding hydraulic pressure HP). Accordingly, the clutch device 26 is maintained in an engaged state without generation of hydraulic pressure from the master cylinder 51, and electric power consumption can be minimized while enabling traveling of the motorcycle 1.

Here, depending on a shifting operation, there may be a situation in which the clutch device 26 is shifted immediately after inputting the hydraulic pressure. In this case, before the solenoid valve 56 is closed and the upstream side is in a low pressure state, the motor 52 is driven in a reverse direction while the solenoid valve 56 is in an open state, a reservoir 51e is caused to communicate with the master cylinder 51 while the master cylinder 51 is decompressed, and a hydraulic pressure on the side of the clutch device 26 is relieved toward the master cylinder 51. Here, driving of the clutch actuator 50 is feedback-controlled on the basis of a detected hydraulic pressure of the upstream-side hydraulic pressure sensor 57.

Even in a state in which the solenoid valve 56 is closed and the clutch device 26 is maintained in a fastened state, as shown in a region D in FIG. 5, a hydraulic pressure on the downstream side will gradually decrease (leak). That is, a hydraulic pressure on the downstream side will gradually decrease due to causes such as a leakage of a hydraulic pressure or a decrease in temperature due to deformation or the like of seals of the solenoid valve 56 and the one-way valve 53c1.

On the other hand, as shown in a region E in FIG. 5, there is also a case in which a hydraulic pressure on the downstream side is increased due to an increase in temperature or the like.

If it is a small hydraulic pressure fluctuation on the downstream side, it is possible to absorb by an accumulator (not shown), and it is not necessary to increase the electric power consumption by operating the motor 52 and the solenoid valve 56 every time the hydraulic pressure fluctuates.

As shown in the region E in FIG. 5, when a hydraulic pressure on the downstream side is increased to the upper limit holding hydraulic pressure HP, by decreasing the supply of electric power to the solenoid valve 56 or the like, the solenoid valve 56 is gradually brought into an open state, and the hydraulic pressure on the downstream is relieved toward the upstream side.

As shown in a region F in FIG. 5, when a hydraulic pressure on the downstream side is decreased to the lower limit holding hydraulic pressure LP, the solenoid valve 56 starts supply of electric power to the motor 52 while being closed, and a hydraulic pressure on the upstream side is increased. When the hydraulic pressure on the upstream side exceeds the hydraulic pressure on the downstream side, the hydraulic pressure is supplemented (recharged) toward the downstream side via the bypass oil path 53c and the one-way valve 53c1. When the hydraulic pressure on the downstream side reaches the upper limit holding hydraulic pressure HP, supply of electric power to the motor 52 is stopped and generation of the hydraulic pressure is stopped. Accordingly, the hydraulic pressure on the downstream side is maintained between the upper limit holding hydraulic pressure HP and the lower limit holding hydraulic pressure LP, and the clutch device 26 is maintained in a fastened state.

When the gearbox 21 is at a neutral position upon stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 becomes in an open state, and a hydraulic pressure in the downstream side oil path 53b is returned to the reservoir 51e. As described above, the slave cylinder 28 side (the downstream side) is in a state of a pressure lower than the touch point hydraulic pressure TP, and the clutch device 26 becomes in a disengaged state. This state corresponds to regions G and H in FIG. 5.

On the other hand, if the gearbox 21 is kept in an in-gear state upon stoppage of the motorcycle 1, a standby state in which a standby hydraulic pressure WP is applied at the slave cylinder 28 side is established.

The standby hydraulic pressure WP is a hydraulic pressure that is slightly lower than the touch point hydraulic pressure TP at which connection of the clutch device 26 starts, and a hydraulic pressure (a hydraulic pressure applied to the regions A and H in FIG. 5) at which the clutch device 26 is not connected. Invalid filling of the clutch device 26 (rattling of each part or cancellation of a reaction force of an operation, application of pre-compression to a hydraulic path, and so on) becomes possible due to application of the standby hydraulic pressure WP, working responsiveness upon connection of the clutch device 26 is increased.

<Shift Control>

Next, shift control of the motorcycle 1 will be described.

The motorcycle 1 of the embodiment performs control of decreasing the standby hydraulic pressure WP supplied to the slave cylinder 28 when a shift operation from a first to a neutral position with respect to the shift pedal 32 is performed in a state in which a gear position of the gearbox 21 is in a first speed in-gear state and in an in-gear stoppage state in which a vehicle speed is less than a set value that corresponds to stoppage of the motorcycle.

Here, when the motorcycle 1 is in a stoppage state and a gear position of the gearbox 21 is disposed at any variable speed level position other than the neutral position, i.e., when the gearbox 21 is in an in-gear stoppage state, the preset standby hydraulic pressure WP is supplied to the slave cylinder 28.

The standby hydraulic pressure WP is set to a first set value P1 (see FIG. 5) that is a standard standby hydraulic pressure at a normal time (in a case of a non-detection state in which a shifting operation of the shift pedal 32 is not detected). Accordingly, the clutch device 26 is in a standby state in which the invalid filling is performed, responsiveness upon clutch engagement is increased. That is, when a driver increases a throttle opening angle and increases a rotational number of the engine 13, immediate engagement of the clutch device 26 is started due to supply of a hydraulic pressure to the slave cylinder 28, and rapid departure acceleration of the motorcycle 1 is realized.

The motorcycle 1 includes a shift operation detection switch 48 separately from the shift load sensor 42 in order to detect a shift operation of a driver with respect to the shift pedal 32.

Then, in the in-gear stoppage state, when the shift operation detection switch 48 detects a shift operation from a first speed to a neutral position, the hydraulic pressure controller 61 performs control of setting the standby hydraulic pressure WP to a second set value P2 (a low pressure standby hydraulic pressure, see FIG. 5) which is lower than the first set value P1 before performing a shifting operation.

When the gearbox 21 is in an in-gear state, since a standard standby hydraulic pressure corresponding to the first set value P1 is supplied to the slave cylinder 28 at a normal time, a slight, so-called, drag will occur in the clutch device 26. Here, a dog and a slot (a dog hole) meshing with each other in a dog clutch of the gearbox 21 press each other in a rotational direction, and a resistance in engagement release occurs and a shift operation may become heavy. In this case, when the standby hydraulic pressure WP supplied to the slave cylinder 28 is lowered to a low pressure standby hydraulic pressure corresponding to the second set value P2, engagement of the dog and the slot can be easily released, and it is possible to make a shift operation light.

<Shift Operation Detection Switch>

Figure 6:
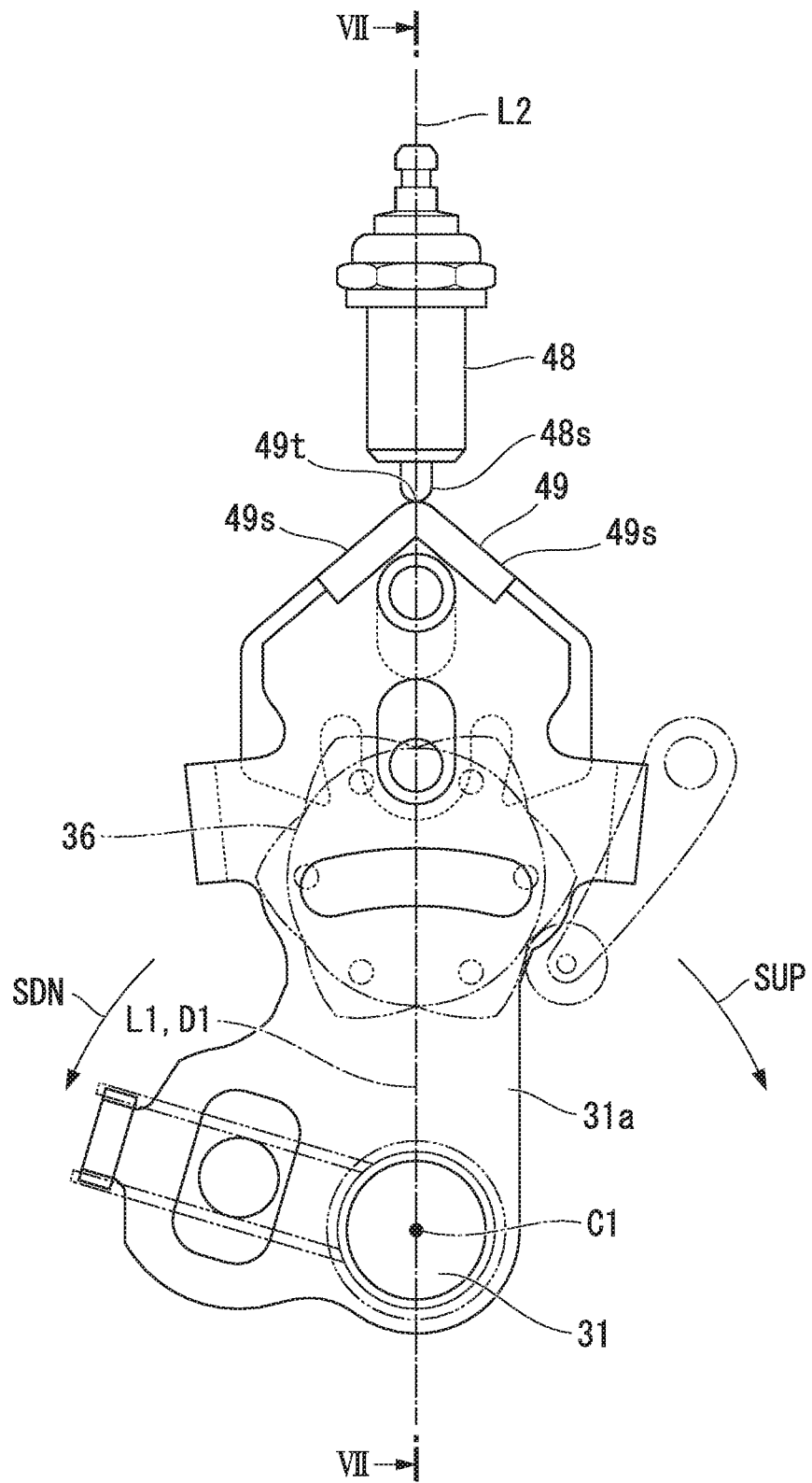
FIG. 6 is a front view showing a shift arm and a shift operation detection switch in an axial direction of a shift spindle.
Figure 7:
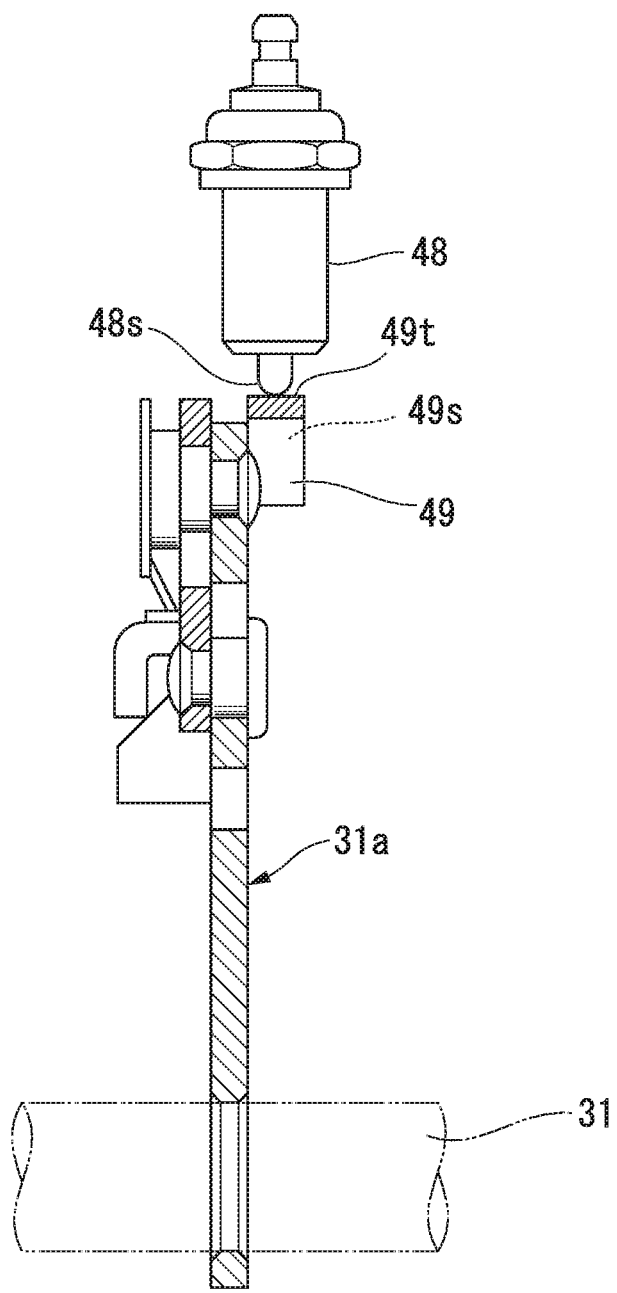
FIG. 7 is a cross-sectional view taken along line VII-VII in FIG. 6.

As shown in FIG. 6 and FIG. 7, the shift operation detection switch 48 is installed so as to face with an outer circumferential end portion of the shift arm 31a, which extends outward in a radial direction from a rotational center (an axial center) C1 of the shift spindle 31, in a radial direction. An arrow SUP in FIG. 6 indicates a shift-up side in a rotational direction of the shift spindle 31, and an arrow SDN indicates a shift-down side in the rotational direction of the shift spindle 31.

Referring to FIG. 6, the shift arm 31a extends along an extension reference line L1 passing through the axial center C1. The shift operation detection switch 48 is supported on a side of the gearbox case 17, and the shift arm 31a relatively rotates with respect to the shift operation detection switch 48.

The shift operation detection switch 48 is formed in a columnar shape, and a centerline L2 is arranged so as to extend along with the radial direction of the shift spindle 31. The shift operation detection switch 48 has a probe 48s that strokes along the centerline L2. The probe 48s protrudes toward a member 49 to be detected installed on an outer circumferential end portion of the shift arm 31a.

The shift arm 31a sets a neutral position D1 in the centerline L2 of the shift operation detection switch 48 which is set at a position that coincides with an extension line of the extension reference line L1. The shift arm 31a is biased toward the neutral position D1 by a return spring (not shown). The member 49 to be detected is installed on an outer circumferential end portion of the shift arm 31a while facing the shift operation detection switch 48. The member 49 to be detected is formed in a convex V shape on an outer side in the radial direction, and installed in a shape symmetrical with respect to the extension reference line L1. The member 49 to be detected has a protrusion top portion 49t directed toward an outer side in the radial direction, and a pair of inclined surface portions 49s formed at both sides of the protrusion top portion 49t in the rotational direction of the shift spindle 31. The pair of inclined surface portions 49s are disposed substantially perpendicular to each other. Round chamfering having the same radius as a spherical tip surface of the probe 48s of the shift operation detection switch 48 is applied on the protrusion top portion 49t.

As shown in FIG. 6, the shift arm 31a is disposed at the neutral position D1 in a state in which an operation load from the shift pedal 32 is not applied. Here, the protrusion top portion 49t of the member 49 to be detected confronts the probe 48s of the shift operation detection switch 48 in the radial direction. Accordingly, the probe 48s of the shift operation detection switch 48 is in a retracted state, and the shift operation detection switch 48 is in an ON or OFF state (in the drawing, an ON state).

Figure 8:
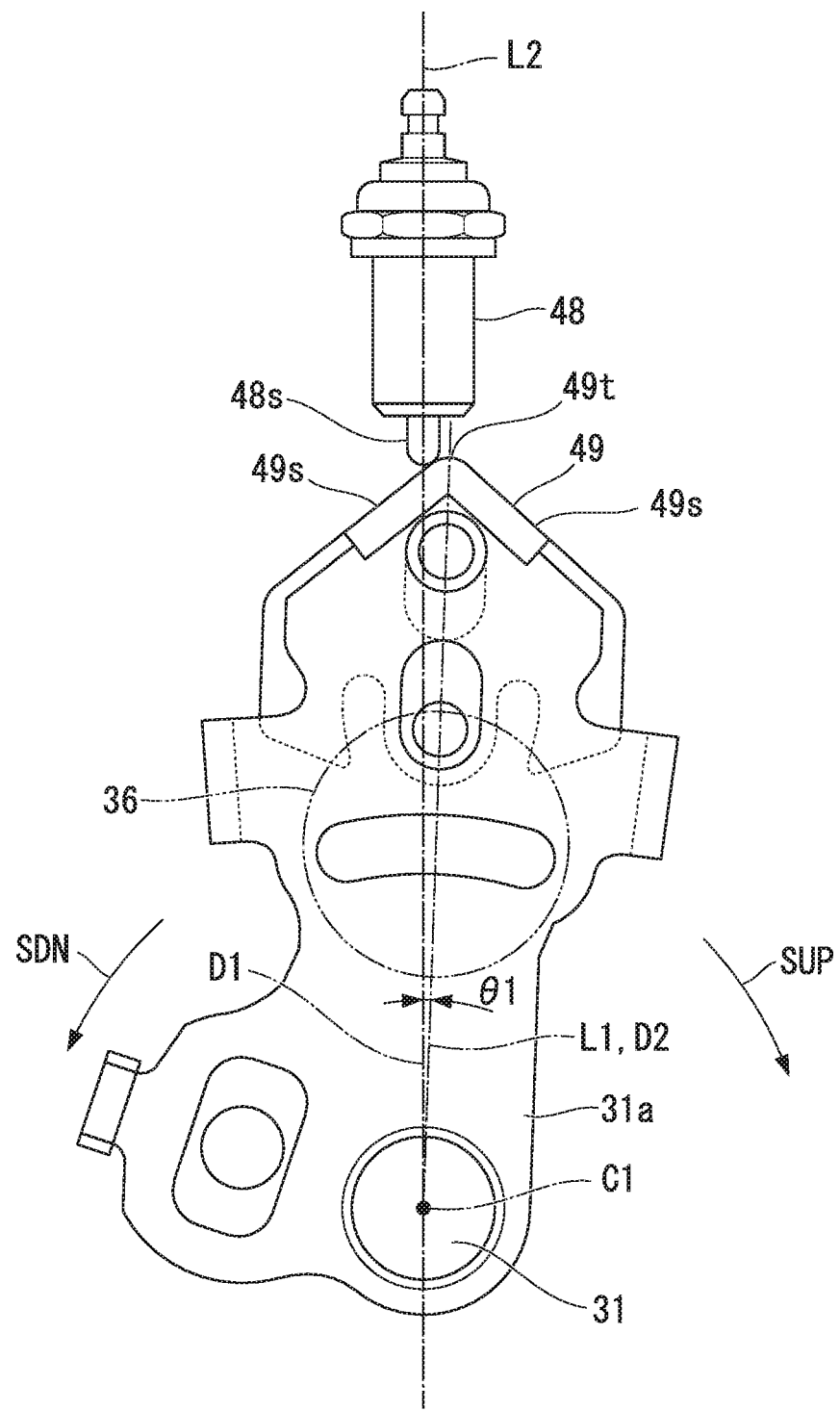
FIG. 8 is a front view corresponding to FIG. 6 in a state in which the shift operation detection switch has detected a shift operation.

On the other hand, as shown in FIG. 8, when an operation load is applied to the shift pedal 32 and the shift spindle 31 is rotated, the shift arm 31a is rotated integrally therewith. In FIG. 8, the shift spindle 31 and the shift arm 31a are rotated toward a shift-up side. When the shift arm 31a is rotated, the protrusion top portion 49t of the member 49 to be detected is displaced with respect to the probe 48s of the shift operation detection switch 48 in a circumferential direction. Then, the probe 48s is varied to a protrusion state while sliding contacting with one of the pair of inclined surface portions 49s, and an ON/OFF state of the shift operation detection switch 48 is switched. Accordingly, the ECU 60 detects rotation of the shift spindle 31 from the neutral position D1, i.e., a shifting operation to the shift pedal 32. A rotation position (a shift operation detection position) D2 of the shift arm 31a at this time is a position rotated from the neutral position D1 by a small angle θ1 of 2 to 3 degrees.

Further, while it is shown that detection of ON or OFF is performed such that ON is detected when the probe 48s retreats and OFF is detected when the probe 48s protrudes in FIG. 6 and FIG. 8, detection of ON or OFF may be performed such that ON is detected when the probe 48s comes in contact with the inclined surface portions 49s and OFF is detected when the probe 48s does not come in contact with the inclined surface portions 49s.

In this way, since the member 49 to be detected having the protrusion top portion 49t is installed on the outer circumferential end portion of the shift arm 31a extending closer to the outer circumference than to the shift spindle 31, the shift operation detection switch 48 sensitively detects slight rotation of the shift spindle 31 due to a shifting operation of the shift pedal 32. In addition, in comparison with the case in which a shifting operation is detected from a shift operation load, even when a shifting operation is detected from a rotation position of the shift arm 31a fixed to the shift spindle 31, sensitive detection becomes possible. In addition, in comparison with the case in which displacement of a working member (the shift drum 36 or the like) separate from the shift spindle 31 is detected, a shifting operation can be more directly detected.

<Clutch Control Mode>

Figure 13:
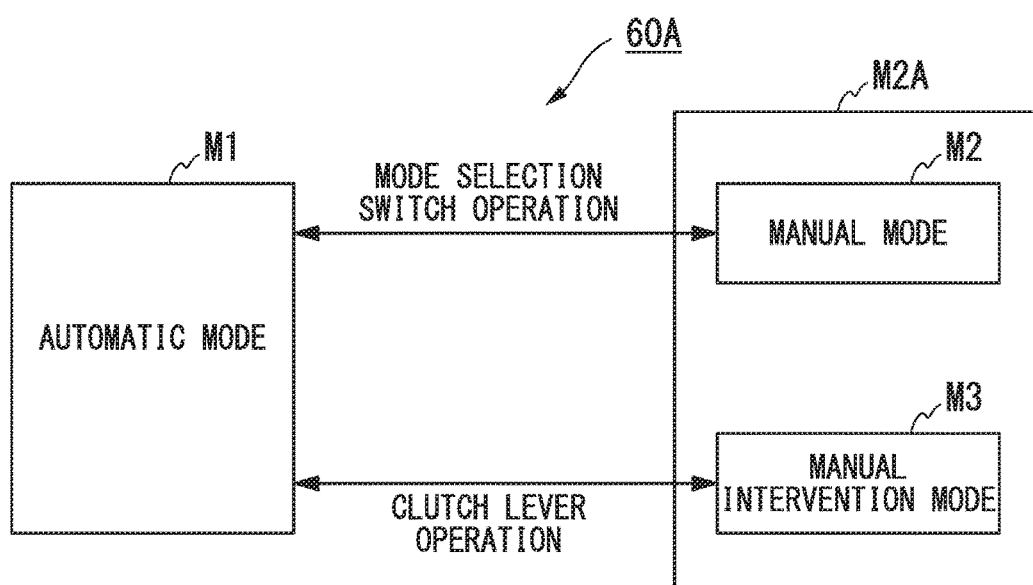
FIG. 13 is a view for explaining transition between clutch control modes of the embodiment.

As shown in FIG. 13, a clutch control device 60A of the embodiment has three types of clutch control modes. The clutch control modes are appropriately shifted according to operations of a clutch control mode selection switch 59 (see FIG. 4) and the clutch lever 4b (see FIG. 1) between the three types of modes of an automatic mode M1 of performing automated control, a manual mode M2 of performing a manual operation and a manual intervention mode M3 of performing a temporary manual operation. Further, an object including the manual mode M2 and the manual intervention mode M3 is referred to as a manual system M2A.

The automatic mode M1 is a mode of controlling the clutch device 26 by calculating a clutch capacity appropriate for a traveling state through automatic departure and shift control. The manual mode M2 is a mode of controlling the clutch device 26 by calculating a clutch capacity according to a clutch operation instruction from an occupant. The manual intervention mode M3 is a temporary manual operation mode of controlling the clutch device 26 by receiving a clutch operation instruction from an occupant during the automatic mode M1 and calculating a clutch capacity from the clutch operation instruction. Further, the modes are set such that when an occupant stops (perfectly releases) an operation of a clutch lever 4b during the manual intervention mode M3 it returns to the automatic mode M1.

The clutch control device 60A of the embodiment starts control from a clutch-off state (a disconnection state) in the automatic mode M1 upon starting of the system. In addition, the clutch control device 60A is set to return to the clutch-off in the automatic mode M1 since a clutch operation is unnecessary upon stoppage of the engine 13.

The automatic mode M1 basically performs the clutch control automatically, and allows the motorcycle 1 to travel with no lever operation. In the automatic mode M1, a clutch capacity is controlled by a throttle opening angle, an engine rotational number, a vehicle speed and a shift sensor output. Accordingly, the motorcycle 1 can be started without engine stall with only a throttle operation and can be shifted with only a shift operation. However, there is a situation in which the clutch device 26 is automatically disconnected upon an extremely low speed equivalent to idling. In addition, in the automatic mode M1, it is switched to the manual intervention mode M3 by grasping the clutch lever 4b, and it is also possible to arbitrarily disconnect the clutch device 26.

Meanwhile, in the manual mode M2, a clutch capacity is controlled according to a lever operation by an occupant. The automatic mode M1 and the manual mode M2 can be switched by operating the clutch control mode selection switch 59 (see FIG. 4) during stoppage. Further, the clutch control device 60A may include an indicator indicating that a lever operation is effective upon shifting to the manual system M2A (the manual mode M2 or the manual intervention mode M3).

The manual mode M2 basically performs the clutch control manually, and a clutch hydraulic pressure can be controlled according to an actuation angle of the clutch lever 4b. Accordingly, it is possible to control disconnection and connection of the clutch device 26 as an occupant desires, and it is possible to connect the clutch device 26 to travel the motorcycle even at an extremely low speed equivalent to idling. However, an engine stall may occur according to a way of lever operation, and an automatic departure depending solely on a throttle operation is also not possible. Further, even in the manual mode M2, clutch control is automatically intervened upon a shift operation.

While disconnection and connection of the clutch device 26 is performed automatically by the clutch actuator 50 in the automatic mode M1, a manual operation can be temporarily intervened to the automated control of the clutch device 26 by performing a manual clutch operation with respect to the clutch lever 4b (the manual intervention mode M3).

Figure 12:
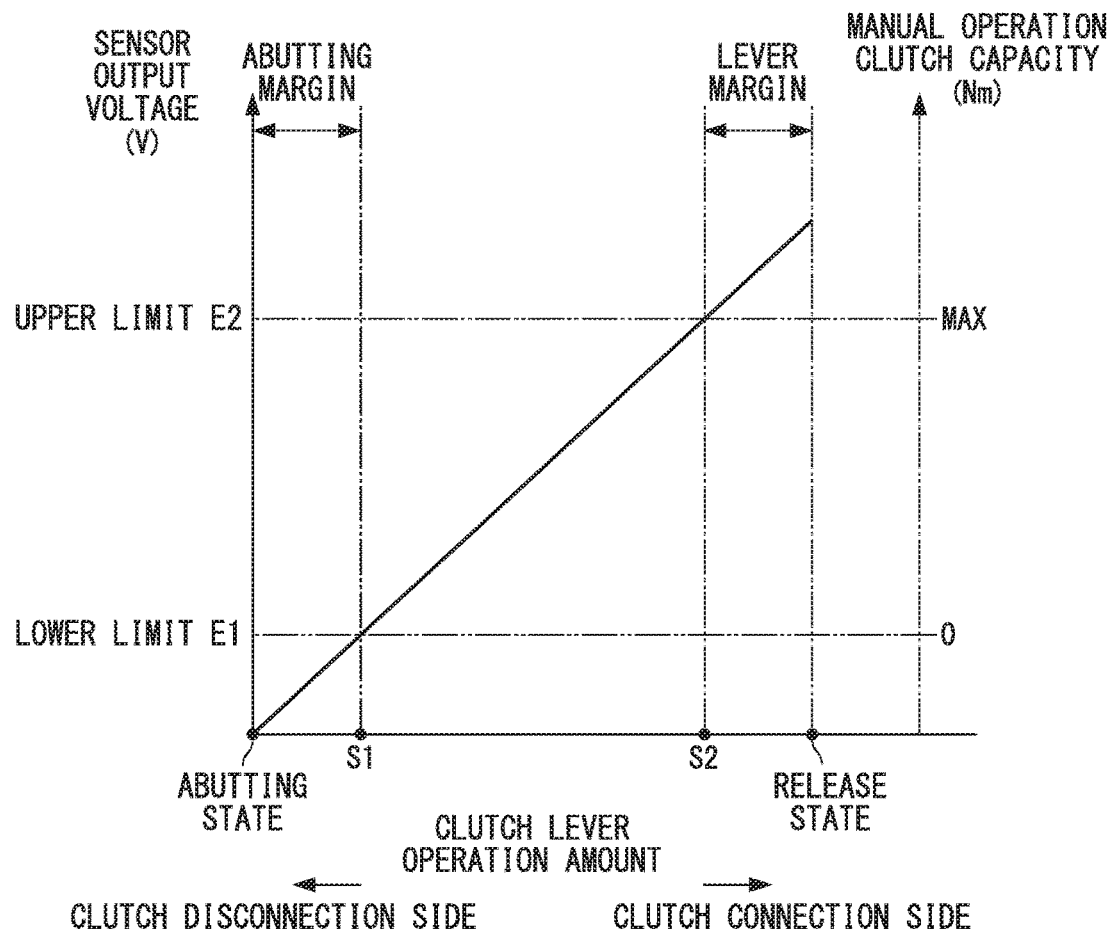
FIG. 12 is a graph showing a correlation between a clutch lever operation amount, a sensor output voltage and a clutch capacity of the embodiment.

As shown in FIG. 12, an operation amount (a pivot angle) of the clutch lever 4b and an output value of a clutch lever operation amount sensor 4c are in a proportional relationship (correlation) with each other. The ECU 60 calculates a target hydraulic pressure of the clutch device 26 on the basis of the output value of the clutch lever operation amount sensor 4c.

Figure 11A:
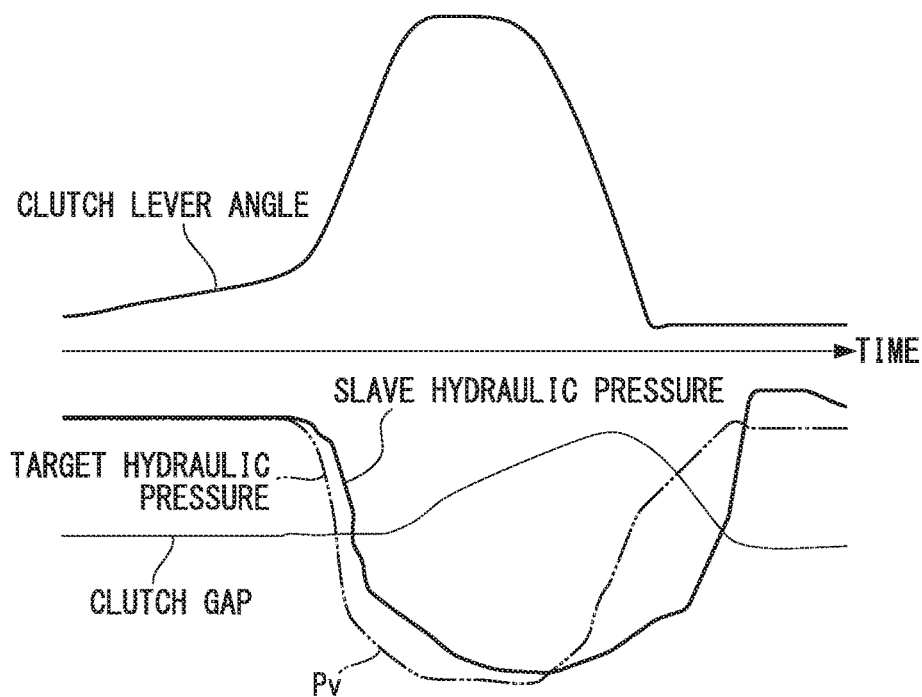
FIG. 11A is a time chart of a comparative example for showing variation of a control parameter in a clutch control device of the embodiment.

Referring also to FIG. 11A, even when a target hydraulic pressure is calculated on the basis of an operation amount (a clutch lever angle) of the clutch lever 4b, an actual hydraulic pressure (a slave hydraulic pressure) generated in the slave cylinder 28 follows the target hydraulic pressure with delay. That is, since a pressure loss occurs in the hydraulic pressure pipeline between the clutch actuator 50 and the slave cylinder 28, a delay occurs in following a slave hydraulic pressure (that is, a clutch gap) which is a control target hydraulic pressure with respect to target hydraulic pressure on the basis of a lever operation amount. In this way, when a delay of the control target hydraulic pressure with respect to the target hydraulic pressure occurs, a driver may feel badness of responsiveness of the clutch device 26. Control of solving this point will be described below.

Further, while the slave hydraulic pressure is detected by the downstream-side hydraulic pressure sensor 58, a difference with a hydraulic pressure actually applied to the clutch device 26 (the slave cylinder 28) occurs. This is because a pressure loss occurs in an oil path from the downstream-side hydraulic pressure sensor 58 to the slave cylinder 28. In particular, when the hydraulic pressure is abruptly varied, a difference between a slave hydraulic pressure detected by the downstream-side hydraulic pressure sensor 58 and a slave hydraulic pressure actually applied to the clutch device 26 is increased. When the pressure is increased, a hydraulic pressure actually applied to the clutch device 26 is increased with delay with respect to the hydraulic pressure detected by the downstream-side hydraulic pressure sensor 58.

<Manual Clutch Operation>

As shown in FIG. 1, the clutch lever 4b serving as a clutch manual operator is attached to a base end side (an inner side in the vehicle width direction) of a left grip of the steering handle 4a. The clutch lever 4b does not have any mechanical connection with the clutch device 26 which uses a cable, a hydraulic pressure, or the like and functions as an operator configured to transmit a clutch operation requirement signal to the ECU 60. That is, the motorcycle 1 employs a clutch-by-wire system configured to electrically connect the clutch lever 4b and the clutch device 26.

Referring also to FIG. 4, the clutch lever operation amount sensor 4c configured to detect an operation amount (a pivot angle) of the clutch lever 4b is installed integrally with the clutch lever 4b. The clutch lever operation amount sensor 4c converts an operation amount of the clutch lever 4b into an electrical signal and outputs the converted electrical signal.

In a state in which an operation of the clutch lever 4b is effective (the manual system M2A), the ECU 60 drives the clutch actuator 50 based on the output of the clutch lever operation amount sensor 4c. Further, the clutch lever 4b and the clutch lever operation amount sensor 4c may be integrated with each other or may be separate from each other.

The motorcycle 1 includes the clutch control mode selection switch 59 configured to switch a control mode of a clutch operation. The clutch control mode selection switch 59 can arbitrarily perform switching between the automatic mode M1 of automatically performing clutch control and the manual mode M2 of manually performing clutch control according to an operation of the clutch lever 4b under a predetermined condition. For example, the clutch control mode selection switch 59 is installed on a handle switch attached to the steering handle 4a. Accordingly, an occupant can easily operate the clutch operation upon a normal driving.

Referring also to FIG. 12, the clutch lever 4b is pivotable between a release state, which is a state in which the clutch lever 4b is released without being under a gripping operation of an occupant and is pivoted toward a clutch connection side, and an abutting state, which is a state in which the clutch lever 4b is pivoted toward a grip side (a clutch disconnection side) by the gripping of an occupant and is abut against the grip. The clutch lever 4b is biased to return to a release state that is an initial position when released from a gripping operation by an occupant.

For example, the clutch lever operation amount sensor 4c is configured to set an output voltage to zero in a state in which the clutch lever 4b is completely gripped (an abutting state) and to increase an output voltage from the abutting state according to a release operation of the clutch lever 4b (an operation toward a clutch connection side). In the embodiment, among the output voltage of the clutch lever operation amount sensor 4c, a range that excludes a lever margin which is present at the beginning of gripping the clutch lever 4b and an abutting margin which secures a gap having a size in which a finger can be placed between the gripped lever and the grip is set to an effective voltage range (an effective operation range of the clutch lever 4b).

Specifically, a range from an operation amount S1, which is an operation amount in which the clutch lever 4b is released only by the abutting margin from the abutting state of the clutch lever 4b, to an operation amount S2, which is an operation amount in which the clutch lever 4b is released until a lever margin starts, is set so as to correspond to a range from a lower limit value E1 to an upper limit value E2 of an effective voltage. The range from the lower limit value E1 to the upper limit value E2 corresponds to a range from zero to MAX of a calculated value of a manual operation clutch capacity in a proportional relation. Accordingly, an influence of mechanical ratting, a sensor variation, or the like, can be decreased, and reliability of a clutch driving amount required by a manual operation can be increased. Further, a value at the operation amount S1 of the clutch lever 4b may be set as the upper limit value E2 of the effective voltage, and a value at the operation amount S2 may be set as the lower limit value E1.

<Peak Hold Control>

Figure 11B:
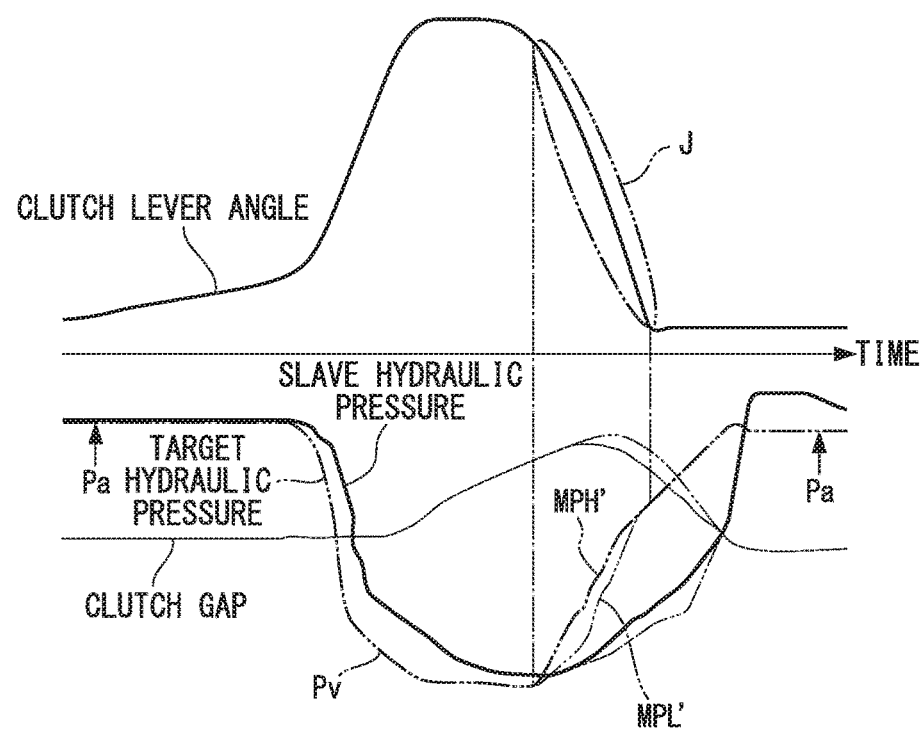
FIG. 11B is a time chart showing variation of a control parameter in the clutch control device of the embodiment.

Referring to FIG. 11B, the clutch control device 60A of the embodiment performs peak hold control, which will be described below in detail, when a connection operation speed (a clutch operation speed) of the clutch lever 4b is high. The peak hold control changes a control target value (a target hydraulic pressure) of a clutch capacity toward a clutch connection side with respect to an operation target hydraulic pressure Pv corresponding to an operation amount of the clutch lever 4b when a connection operation speed of the clutch lever 4b is high. Accordingly, when a connection operation speed of the clutch lever 4b is high, a target hydraulic pressure can be increased more rapidly (the clutch device 26 can be connected more rapidly).

Figure 9:
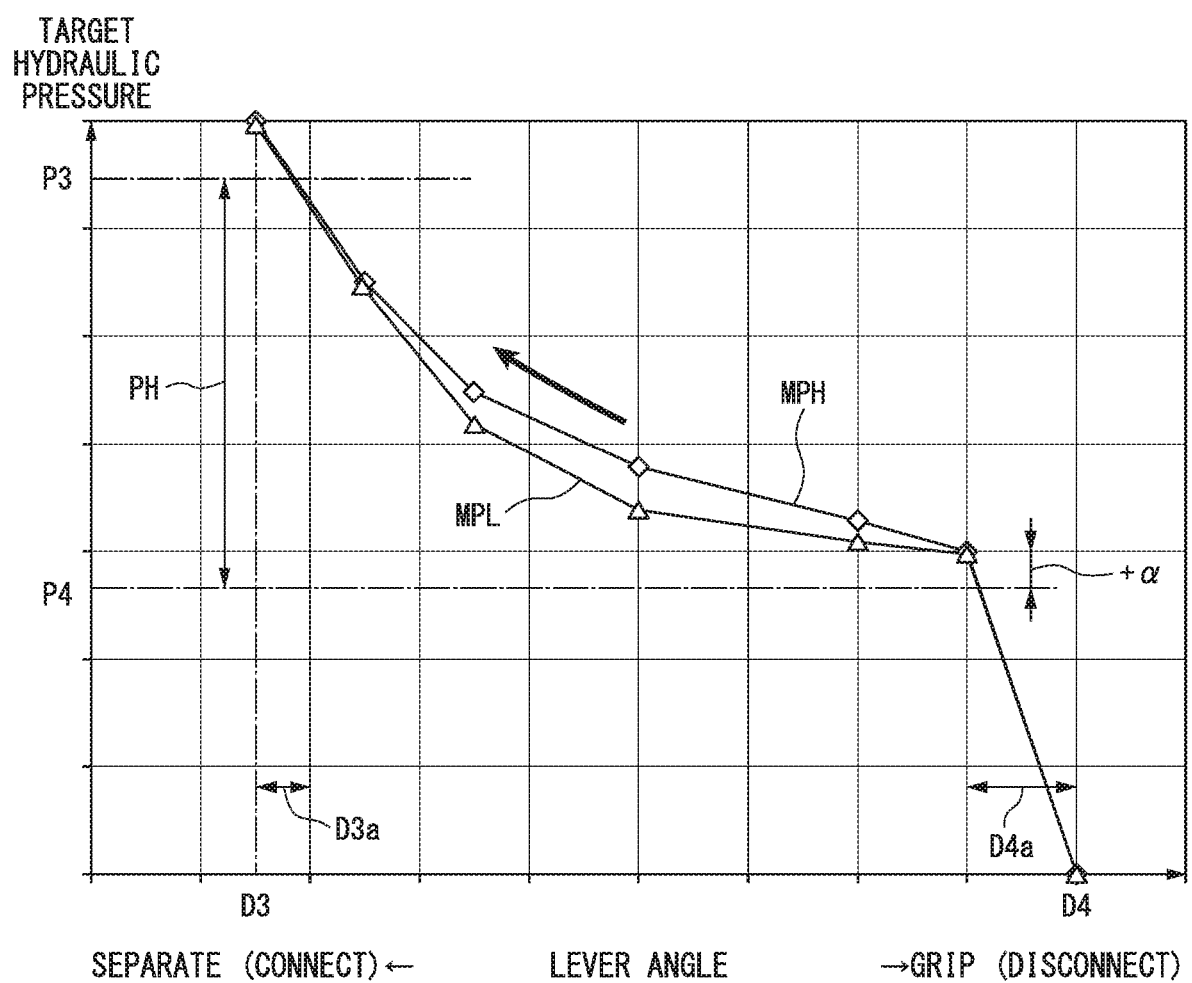
FIG. 9 is a graph showing a correlation between a lever angle and a target hydraulic pressure of the embodiment.

Referring to FIG. 9, in a graph in FIG. 9, a vertical axis indicates a target hydraulic pressure of clutch control (a control target value of a slave hydraulic pressure), and a lateral axis indicates a pivot angle of the clutch lever 4b (a lever angle). In addition, a lever angle D3 represents a release lever angle when the clutch lever 4b is separated and released, and a lever angle D4 represents an abutting-lever angle when the clutch lever 4b is gripped to abut against the grip (or when pivoted to the vicinity of abutting against the grip). The clutch device 26 is in a connection state in which sliding is 0 when the clutch lever 4b is in a range from the release lever angle D3 to a lever margin D3a, and the clutch device 26 is in a disconnection state in which a transmission torque is 0 when the clutch lever 4b is in a range from the lever angle D4 to an abutting margin D4a.

In addition, a range PH of a target hydraulic pressure represents a peak hold hydraulic pressure range in which peak hold control is performed. In addition, a target hydraulic pressure P3 represents an upper limit hydraulic pressure of the peak hold hydraulic pressure range PH, and a target hydraulic pressure P4 represents a lower limit hydraulic pressure of the peak hold hydraulic pressure range PH. The peak hold hydraulic pressure range PH corresponds to a range that becomes a half clutch state in which the clutch device 26 can transmit a part of power. The peak hold hydraulic pressure range PH corresponds to a range until a hydraulic pressure on a side of the slave cylinder 28 (the downstream side) detected by the downstream-side hydraulic pressure sensor 58 is increased to substantially the touch point hydraulic pressure TP or more and reaches a hydraulic pressure at which the clutch device 26 is completely fastened (a clutch gap is 0).

In an initial stage (a lever release initial stage, a range of the abutting margin D4a) in which the clutch lever 4b is released from the abutting lever angle D4, the target hydraulic pressure is increased relatively rapidly according to variation of the lever angle. In the lever release initial stage, a way of varying a target hydraulic pressure is constant regardless of a lever operation speed. Then, in the peak hold hydraulic pressure range PH after exceeding the lever release initial stage, a way of varying a target hydraulic pressure is varied according to a lever operation speed.

Further, in a final stage of the lever release initial stage, the target hydraulic pressure is included in the peak hold hydraulic pressure range PH by an extent of +a (exceeds the lower limit hydraulic pressure P4 of the peak hold hydraulic pressure range PH by an extent of $+\alpha$). Accordingly, in a state in which a target hydraulic pressure exceeds a lever release initial stage, the slave hydraulic pressure following the target hydraulic pressure with delay also reaches the peak hold hydraulic pressure range PH.

The ECU 60 starts change control of a target hydraulic pressure map when the target hydraulic pressure exceeds the lower limit hydraulic pressure P4 of the peak hold hydraulic pressure range PH.

Here, the ECU 60 calculates a lever operation speed at a prescribed control period, and updates the fastest value of the lever operation speed when the current lever operation speed is greater than the lever operation speed until now. Here, the target hydraulic pressure map in the peak hold hydraulic pressure range PH is shifted to a high speed side map MPH.

Meanwhile, the ECU 60 maintains the present fastest value of the lever operation speed in this state when the current lever operation speed is later than the lever operation speed until now. Here, the target hydraulic pressure map in the peak hold hydraulic pressure range PH is not shifted to a low speed side map MPL, and the map MPH according to the present fastest value in this state is maintained.

Hereinafter, the above-mentioned series of control is referred to as peak hold control.

The ECU 60 returns the target hydraulic pressure map to the low speed side map MPL (an actual speed map, corresponding to the operation target hydraulic pressure Pv) when the slave hydraulic pressure exceeds the peak hold hydraulic pressure range PH.

That is, the fact that the slave hydraulic pressure exceeds the peak hold hydraulic pressure range PH is a reset condition of the peak hold control.

Further, while the peak hold control of the embodiment exemplarily shows upon the clutch connection operation, the peak hold control may be applied upon the clutch disconnection operation. Accordingly, when the clutch disconnection operation speed is high, a control target value of a clutch capacity is varied toward a clutch disconnection side, and a slave hydraulic pressure can be decreased more rapidly (the clutch device 26 can be disconnected more rapidly).

Figure 10:
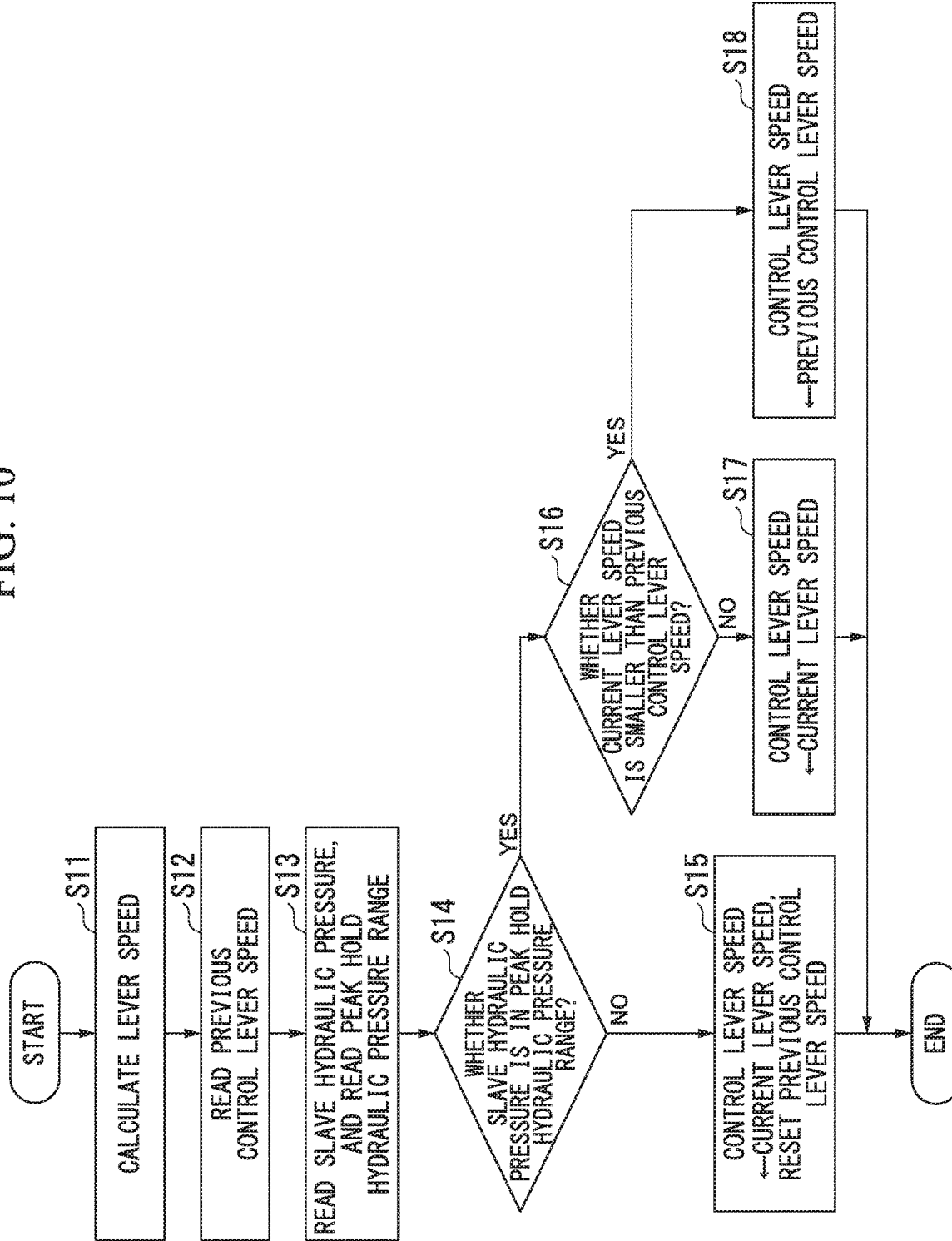
FIG. 10 is a flowchart showing processing of peak hold control of the embodiment.

Next, an example of processing performed by the ECU 60 upon the peak hold control will be described with reference to a flowchart in FIG. 10. The control flow is repeatedly performed at a prescribed control period (1 to 10 msec).

First, the ECU 60 calculates an operation speed (a lever operation speed, hereinafter, may be simply referred to as a lever speed) toward a connection side of the clutch lever 4b (step S11). Calculation of the lever speed is performed by, for example, time differentiation of a lever angle. The calculated lever operation speed is sequentially stored in the memory 62.

Next, the ECU 60 performs reading of a lever speed for control of the previous time while calculating the current lever speed (step S12). When there is no lever speed for control of the previous time, for example, immediately after starting the processing or the like, the initially calculated lever speed is set as a lever speed for control.

Next, the ECU 60 performs reading of the peak hold hydraulic pressure range PH, which is previously determined, while reading the slave hydraulic pressure (step S13).

Next, the ECU 60 performs determination of whether the slave hydraulic pressure is in the peak hold hydraulic pressure range PH (step S14).

When the slave hydraulic pressure is in the peak hold hydraulic pressure range PH (YES in step S14), the processing is shifted to step S16. In step S16, it is determined whether the current lever speed is smaller than a lever speed for control of the previous time.

When the current lever speed is higher than the lever speed for control of the previous time (NO in step S16), the processing is shifted to step S17, the current lever speed is set to the lever speed for control, and the processing is temporarily terminated.

When the current lever speed is smaller than the lever speed for control of the previous time (YES in step S16), the processing is shifted to step S18, and the processing is temporarily terminated while the lever speed for control of the previous time is set to a lever speed for control.

In step S14, when the slave hydraulic pressure is outside the peak hold hydraulic pressure range PH (NO in step S14), i.e., when the slave hydraulic pressure is equal to or less than the lower limit hydraulic pressure P4 and is equal to or larger than an upper limit hydraulic pressure P3, the processing is shifted to step S15.

In step S15, the current lever speed is set to a lever speed for control and the lever speed for control of the previous time is reset, and the processing is temporarily terminated.

According to the processing, when the lever operation speed is high in the peak hold hydraulic pressure range PH, the high speed side map MPH is fixed, and a higher target hydraulic pressure is set with respect to the lever angle so that the clutch device 26 is connected more rapidly. In addition, when the peak hold control is reset, the processing returns to the low speed side map MPL, and a way of varying a target hydraulic pressure returns to before the peak hold control. Further, while only one high speed side map MPH is shown in FIG. 9, a configuration in which a plurality of high speed side maps MPH are provided and these are varied according to a connection operation speed of the clutch lever 4b may be provided.

<Temporal Change of Clutch Control Parameter>

An example of a temporal change of a clutch control parameter will be described with reference to FIG. 11A and FIG. 11B.

Referring to a comparative example in FIG. 11A, when a gripping operation of the clutch lever 4b is performed upon clutch engagement in the automatic mode M1, a pivot angle of the clutch lever 4b is increased. The clutch actuator 50 is operated to be linked with an operation (an increase in pivot angle) of the clutch lever 4b, and a target hydraulic pressure of clutch control (a control target value of a slave hydraulic pressure) is reduced according to variation in operation amount (pivot angle) of the clutch lever 4b. That is, the operation target hydraulic pressure Pv is reduced. Accordingly, the clutch device 26 is operated in a disconnection direction.

In addition, when a release operation from gripping of the clutch lever 4b is performed, a pivot angle of the clutch lever 4b is reduced. The clutch actuator 50 is operated to be linked with an operation (a decrease in pivot angle) of the clutch lever 4b, and a target hydraulic pressure of clutch control (a control target value of a slave hydraulic pressure) is increased according to variation in operation amount (pivot angle) of the clutch lever 4b. That is, the operation target hydraulic pressure Pv is increased. Accordingly, the clutch device 26 is operated in a connection direction.

Here, the target hydraulic pressure (the operation target hydraulic pressure Pv) is controlled to vary in proportion to variation of a lever angle. In other words, the target hydraulic pressure is controlled to vary 1:1 with respect to a lever angle.

Meanwhile, a slave hydraulic pressure (and a clutch gap) that is an actual control target is varied with delay with respect to the target hydraulic pressure by an influence of a resistance (pressure loss) in a hydraulic path from the clutch actuator 50 to the slave cylinder 28. Accordingly, a slight operation delay of the clutch device 26 with respect to an operation of the clutch lever 4b occurs, a driver may feel badness of disconnection and badness of connection of the clutch device 26.

Referring to FIG. 11B, in the embodiment, when the target hydraulic pressure is in the peak hold hydraulic pressure range PH according to the lever release operation speed, a target hydraulic pressure map for a high speed operation is selected.

Accordingly, in a region J in which a lever release operation speed is high, the target hydraulic pressure is varied from a target hydraulic pressure MPL' corresponding to the low speed side map MPL, to a target hydraulic pressure MPH' corresponding to the high speed side map MPH. Accordingly, a slave hydraulic pressure and a clutch gap can be varied earlier than the operation target hydraulic pressure Pv.

In a target hydraulic pressure map for a high speed operation, a target hydraulic pressure is increased at an earlier timing compared to a target hydraulic pressure map for a low speed operation which corresponds to the operation target hydraulic pressure Pv. For this reason, it is possible to increase a slave hydraulic pressure at an earlier timing than following the operation target hydraulic pressure Pv, to reduce a clutch gap while starting a clutch stroke, and to connect the clutch device 26.

Accordingly, even when a pressure loss in the clutch hydraulic path is present, a delay of an operation of the clutch device 26 can be minimized. For this reason, a time required for re-connection of the clutch can be reduced, and a driver cannot easily feel badness of connection of the clutch device 26 (make the driver to feel that a clutch connection follows a lever operation) upon a connection operation. In other words, connection responsiveness of the clutch device 26 can be improved.

After that, when the slave hydraulic pressure exceeds or falls below the peak hold hydraulic pressure range PH, the peak hold control is terminated, and returns to the hydraulic pressure control based on the operation target hydraulic pressure Pv. Accordingly, the clutch device 26 can be connected linearly according to the lever operation.

Before and after the manual intervention control, a control target value of a clutch capacity is set to an automated control target hydraulic pressure Pa separated from the manual clutch operation. Further, the peak hold control is not limited to be performed in the manual intervention mode M3 and may be performed in the manual mode M2.

As described above, the clutch control device 60A of the embodiment includes the clutch device 26 configured to disconnect and connect a power transmission between the engine 13 and the gearbox 21, the clutch actuator 50 configured to drive the clutch device 26 and vary a clutch capacity, the ECU 60 configured to calculate a control target value of the clutch capacity, the clutch lever 4b configured to manually operate the clutch device 26, and the clutch lever operation amount sensor 4c configured to convert an operation amount of the clutch lever 4b into an electrical signal. The ECU 60 calculates a clutch operation speed on the basis of the operation amount detected by the clutch lever operation amount sensor 4c and changes a disconnection and connection speed of the clutch device 26 according to the clutch operation speed.

According to the configuration, since the clutch connection speed is varied by the lever operation speed, when the clutch operation is rapid, disconnection and connection of the clutch device 26 can be rapidly performed according to the operation. For this reason, disconnection and connection performance of the clutch device 26 can be improved (responsiveness with respect to the clutch operation can be improved).

In the clutch control device 60A, the ECU 60 changes a disconnection and connection speed of the clutch device 26 by changing a control target value of the clutch capacity according to the clutch operation speed.

According to the configuration, by changing the target hydraulic pressure according to the lever operation speed, it is possible to improve the disconnection and connection performance of the clutch device 26 by simply changing the control target value of the clutch capacity and without changing the hardware.

In the clutch control device 60A, the ECU 60 disconnects and connects the clutch device 26 according to a control target value map (the high speed side map MPH) corresponding to a fastest operation speed when a current clutch operation speed does not reach the fastest operation speed among the clutch operation speeds stored in the memory 62.

According to the configuration, since it is fixed to a control map of the fastest lever operation speed during the clutch operation, even when the clutch operation speed is decreased in midway, disconnection and connection of the clutch device 26 can be stably rapidly performed without decreasing the disconnection and connection speed of the clutch device 26.

In the clutch control device 60A, the ECU 60 disconnects and connects the clutch device 26 according to a control target value map (the high speed side map MPH) corresponding to a fastest operation speed using the current clutch operation speed as the fastest operation speed when the current clutch operation speed exceeds the fastest operation speed among the clutch operation speeds stored in the memory 62.

According to the configuration, when the clutch operation speed is increased in midway, since the disconnection and connection speed of the clutch device is increased according thereto, responsiveness with respect to the clutch operation can be further improved.

In the clutch control device 60A, a control parameter sensor (the downstream-side hydraulic pressure sensor 58) configured to detect a control parameter (a slave hydraulic pressure) of a clutch capacity is provided, and the ECU 60 disconnects and connects the clutch device 26 according to the control target map (the high speed side map MPH) corresponding to the fastest operation speed when the control parameter reaches the first control target value (the lower limit hydraulic pressure P4).

According to the configuration, since the processing is shifted to the peak hold control when the control parameter of the clutch capacity reaches the first control target value, and a disconnection and connection speed of the clutch device 26 is increased by switching the control target value map, responsiveness with respect to the clutch operation can be timely increased.

In the clutch control device 60A, the ECU 60 releases the clutch control according to the control target map corresponding to the fastest operation speed when the control parameter reaches the second predetermined control target value (the upper limit hydraulic pressure P3).

According to the configuration, since the peak hold control is released when the control parameter of the clutch capacity reaches the second control target value, and the control of increasing the disconnection and connection speed of the clutch device 26 is released, energy consumption by an operation of clutch actuator 50 after reaching the clutch connection hydraulic pressure can be minimized.

<Switching of Feedback Control>

Figure 14:
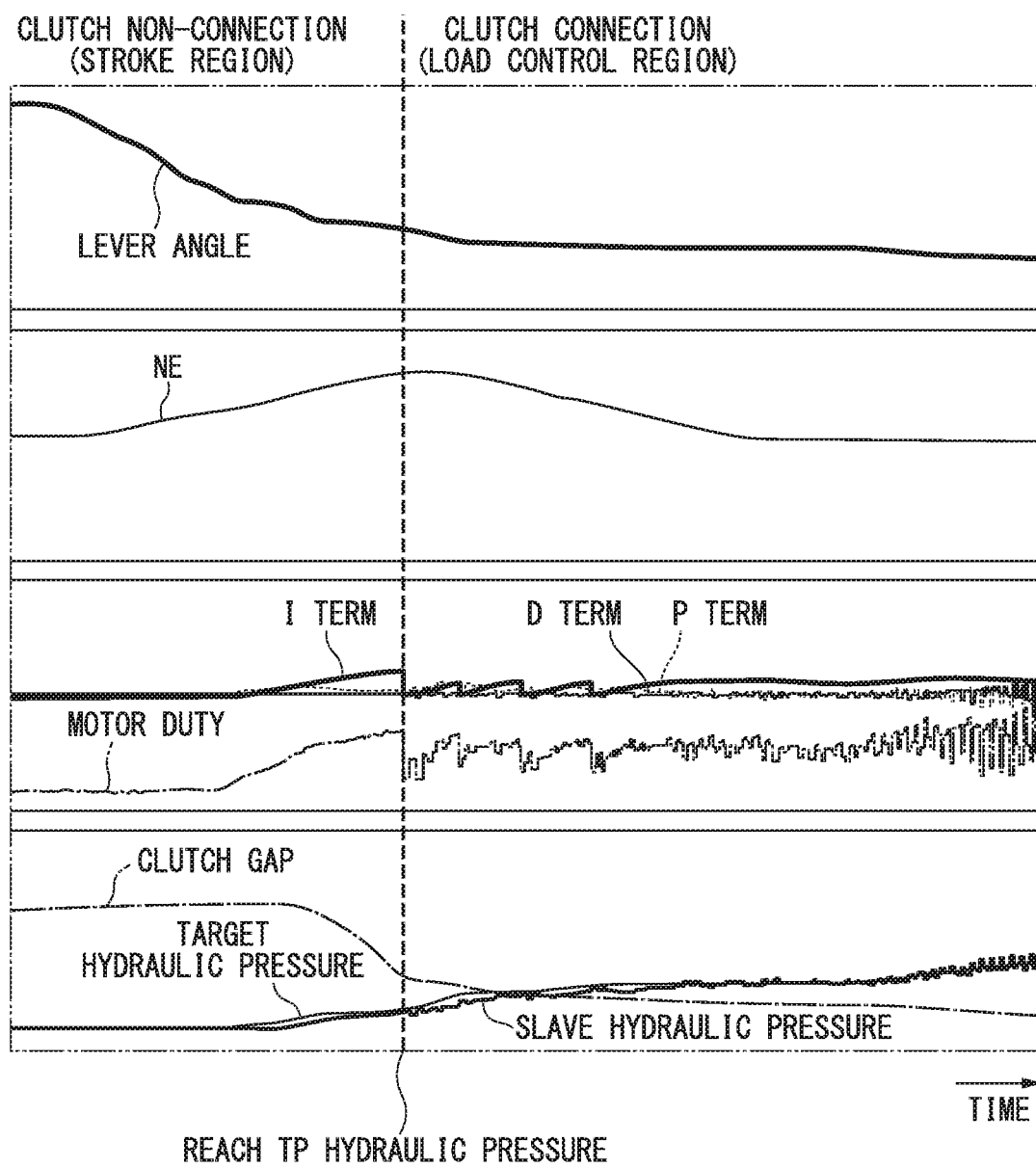
FIG. 14 is a time chart showing variation of a control parameter in the clutch control device of the embodiment.
Figure 16:
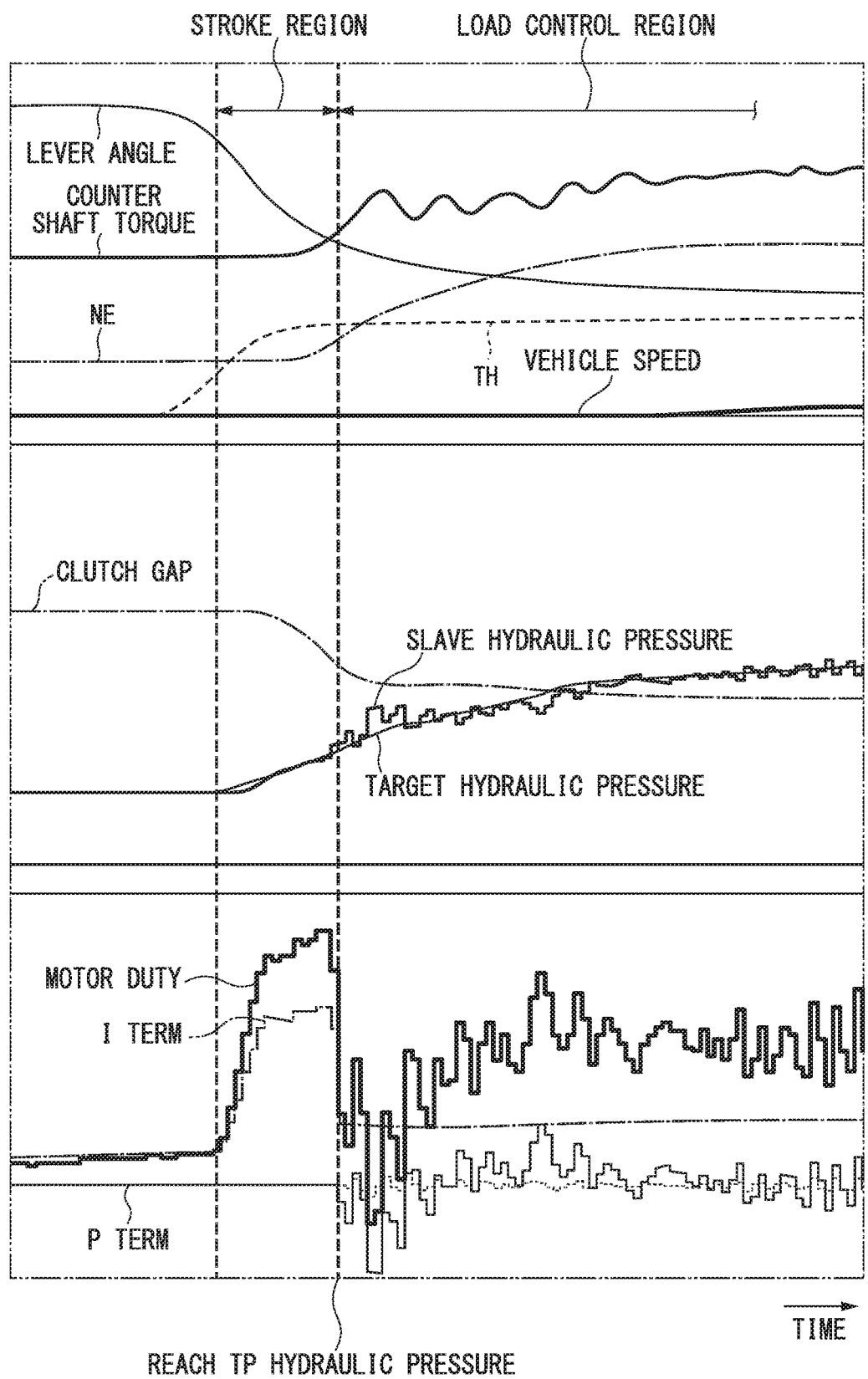
FIG. 16 is a time chart showing variation of a control parameter in the clutch control device of the embodiment.

Referring to FIG. 14 and FIG. 16, in the clutch control device 60A of the embodiment, when the clutch actuator 50 is feedback-controlled so that the actual control parameter (the slave hydraulic pressure) approaches the control target value of the clutch capacity (the target hydraulic pressure), switching of a method of feedback control (proportional-integral-differential (PID) control) is performed according to the connection operation speed of the clutch lever 4b.

In the above mentioned feedback control, when the same control is performed before and after reaching the touch point hydraulic pressure TP, connection of the clutch device 26 may be delayed or a difference in control target value may be excessively increased. In addition, when the clutch capacity is controlled by a hydraulic pressure, since a friction (a flow resistance or a pressure loss in an oil passage) is present in a hydraulic path, a delay in variation in slave hydraulic pressure with respect to variation in target hydraulic pressure occurs. For this reason, occurrence of an event that the slave hydraulic pressure substantially reaches the touch point hydraulic pressure TP while the clutch capacity does not reach the touch point hydraulic pressure TP can be considered.

Figure 17:
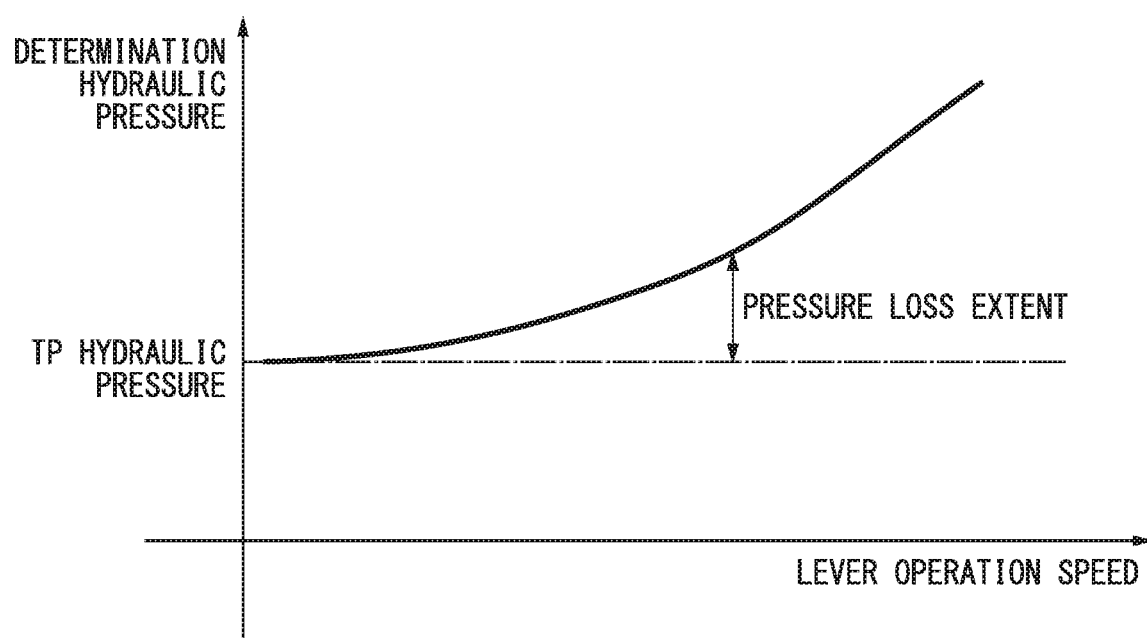
FIG. 17 is a graph showing a correlation between a lever operation speed and a touch point hydraulic pressure of the embodiment.

In the embodiment, feedback control of the control parameter (the slave hydraulic pressure) is varied before and after the touch point hydraulic pressure TP. Here, as shown in FIG. 17, the touch point hydraulic pressure TP that is previously determined is varied according to the connection operation speed of the clutch lever 4b. Specifically, as the connection operation speed of the clutch lever 4b is increased, a value obtained by adding the pressure loss with respect to the predetermined touch point hydraulic pressure TP is set as a determination hydraulic pressure to perform switching of control.

Referring to FIG. 14 and FIG. 16, when the feedback control is varied, in a region in which a lever angle is larger and an amount of change (a rate of change) per a time of the lever angle is a predetermined level or more (a region in which the clutch device 26 is stroked, hereinafter, referred to as a stroke region), feedback control due to an I term (an integral term) main is performed. A measured hydraulic pressure during the clutch stroke (a slave hydraulic pressure) corresponds to a sum of a load of a return spring (clutch spring) reaction force and a load of a pressure loss.

During the clutch stroke, even when a duty of the motor control of the clutch actuator 50 is increased, the slave hydraulic pressure is only a return spring load+a pressure loss.

In the stroke region, since it is a half clutch, an engine rotational number (NE) is increased. A motor duty and an I term start to increase during a second half. A clutch gap starts falling (decreasing) after an increase in motor duty and I term. The slave hydraulic pressure is controlled with a basic I term because a deviation from the target hydraulic pressure is small.

Then, at a timing when the slave hydraulic pressure exceeds the touch point hydraulic pressure TP, the I term is reset, and shifts to the feedback control utilizing the P term (the deviation term), the I term and the D term (the derivative term). After the touch point (after starting the clutch connection), since a state of the clutch device 26 is largely varied with respect to before the touch point (during the clutch stroke), the feedback control is also changed according thereto, and overshoot or hunting is minimized.

Accordingly, upon a half clutch after the clutch connection is started, it is shifted to a load control region in which a transmission load is controlled according to a slave hydraulic pressure. After starting the clutch connection, the pressure is varied according to almost the duty. The measured hydraulic pressure in the load control region corresponds to an extent of a return spring load+a pushing load. Further, in the embodiment, since the touch point hydraulic pressure TP that is a control switching threshold is varied according to a connection operation speed of the clutch lever 4b, even when an oil path pressure loss extent is varied according to the lever operation speed, switching of the feedback control can be performed while having the variation of the loss extent being included.

Figure 15:
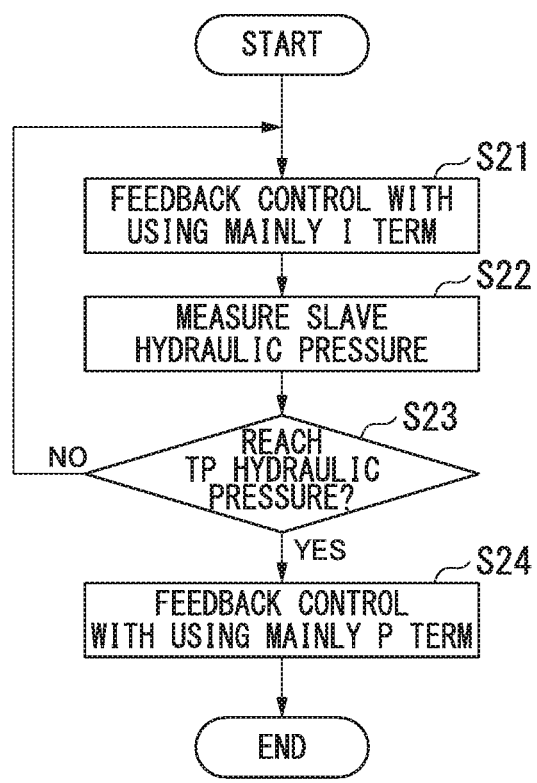
FIG. 15 is a flowchart upon switching of feedback processing of the embodiment.

Next, an example of processing performed by the ECU 60 upon switching of feedback control will be described with reference to a flowchart in FIG. 15. A control flow is repeatedly performed at a prescribed control period (1 to 10 msec).

First, the ECU 60 reads a detected value of the downstream-side hydraulic pressure sensor 58 to measure a slave hydraulic pressure (step S22) while performing feedback control using the I term main (step S21).

Next, the ECU 60 determines whether the measured slave hydraulic pressure reaches the touch point hydraulic pressure TP (step S23).

When the slave hydraulic pressure does not reach the touch point hydraulic pressure TP (NO in step S23), the processing returns to step S21 or is temporarily terminated.

When the slave hydraulic pressure reaches the touch point hydraulic pressure TP (YES in step S23), it is shifted to step S24, is switched to a feedback control mainly using the P term (or using each of the P term, the I term and the D term), and is temporarily terminated.

An example of a temporal change of a clutch control parameter when feedback control is varied will be described with reference to FIG. 16.

In the stroke region, while the lever angle is reduced, a counter shaft torque and an engine rotational number (NE) are increased in a second half of the stroke region. A throttle angle (TH) is increased according to reduction of the lever angle (pivoting toward the clutch connection side), and the NE starts to increase after an increase in TH. For example, a timing of an increase in NE with respect to an increase in TH can be controlled by a throttle-by-wire. A counter shaft torque is gradually increased while waving according to an increase in NE, and a vehicle speed is eventually increased.

A clutch gap starts to decrease after a lever angle is reduced for some extent. In the stroke region in which a rate of change of the lever angle is large, while a high motor duty including also an oil path pressure loss is required, since a deviation between the target hydraulic pressure and the slave hydraulic pressure is small in the stroke region, feedback control using the I term (integral term) main is performed. Meanwhile, in the load control region, a hydraulic pressure overshoot and a shock torque are reduced by switching to an appropriate PID distribution.

Switching (change of a control state) between the stroke region and the load control region is conventionally performed at a switching threshold (a control state change determination value) that assumes the touch point hydraulic pressure TP. However, since the oil path pressure loss value is varied according to the clutch stroke speed, the oil path pressure loss value is added to the switching threshold. That is, for example, when the clutch device 26 is rapidly connected by a rapid lever operation, the oil path pressure loss value is increased and the switching threshold is increased (see FIG. 17).

When energy is lost by a viscous resistance of a fluid, the pressure is lost from an upstream side toward a downstream side of pressurization. For this reason, a pressure actually applied to the slave cylinder 28 is smaller than a value of the downstream-side hydraulic pressure sensor 58 separated at an upstream side while the clutch device 26 is stroked and the fluid flows. Accordingly, a pressure loss extent should be added to a detection value of the downstream-side hydraulic pressure sensor 58. In addition, the pressure loss extent is increased as a clutch operation speed is increased.

For this reason, the switching threshold is set based on a table using the lever operation speed shown in FIG. 17. That is, while the touch point hydraulic pressure TP is statically equivalent to a return spring load of the clutch device 26, when the lever operation is rapid, a load of the increased oil path pressure loss extent is added. Accordingly, a hydraulic pressure value to which an oil path pressure loss extent is added is set to the switching threshold according to an increase in lever operation speed.

In the stroke region, feedback control of the I term main is performed. In the load control region, since the lever operation speed is decreased, the oil path pressure loss is reduced, and linear hydraulic pressure characteristics are obtained with respect to the duty. Accordingly, in the load control region, the processing is switched to the feedback control using the P term, the I term and the D term.

When the control state is changed across the touch point hydraulic pressure TP, determination of whether the integral term is rest is performed using a determination value (a switching threshold) according to the lever operation speed. Accordingly, it is possible to obtain a clutch connection feeling having linearity with respect to the lever operation for each conditions in which an operation speed of the clutch lever 4b to the connection side differs with each other.

As described above, the clutch control device 60A of the embodiment performs feedback control (PID control) such that the ECU 60 sets a control target value of a clutch capacity according to an operation amount detected by the clutch lever operation amount sensor 4c and causes a control parameter detected by the control parameter sensor (the downstream-side hydraulic pressure sensor 58) to approach the control target value, and changes a method of the feedback control when the control parameter reaches a predetermined control state change determination value (the touch point hydraulic pressure TP) during the feedback control.

According to the configuration, since the method of the feedback control is changed when the control parameter of the clutch capacity reaches the control state change determination value, for example, controls which are appropriate for the stroke region before reaching the control state change determination value and for the load control region after reaching the control state change determination value can be performed. For this reason, it is possible to improve connection performance of the clutch device 26 by quickening the convergence of the control parameter. In addition, since the control state change determination value is set on the basis of the clutch operation amount, for example, even when the oil path pressure loss extent of the clutch operation system is affected, connection performance of the clutch device 26 can be improved similarly.

In the clutch control device 60A, the ECU 60 performs the feedback control on the basis of the I term in the PID control before the control parameter reaches the control state change determination value, and performs the feedback control on the basis of the P term in the PID control after the control parameter reaches the control state change determination value.

According to the configuration, since weighting of each terms of the PID control of the clutch actuator 50 is varied before and after the control parameter of the clutch capacity reaches the control state change determination value (before and after the slave hydraulic pressure reaches the touch point hydraulic pressure TP), appropriate feedback control can be performed. Specifically, the feedback control can be performed using the I term (integral term) main before the control parameter reaches the control state change determination value, and the feedback control can be performed using the P term (deviation term) main after the control parameter reaches the control state change determination value. For this reason, the convergence of the control parameter can be accelerated in the load control region in a later stage of the clutch operation while quickening a clutch stroke in the stroke region at the beginning of the clutch operation.

In the clutch control device 60A, the clutch device 26 switches whether to perform the power transmission or not to perform the power transmission when the control parameter reaches the control state change determination value. That is, the clutch device 26 is switched between a connection state in which power transmission is possible and a disconnection state in which power transmission is not possible when the control parameter reaches the control state change determination value.

According to the configuration, since the method of the feedback control is changed at a touch point at which it is switched whether to perform the power transmission or not to perform the power transmission of the clutch device 26 (i.e., switched between a connection state in which power transmission is possible and a disconnection state in which power transmission is not possible), the feedback control can be changed according to the state variation of the clutch device 26, and it is possible to accelerate the convergence of the control parameter while suppressing overshoot or hunting of the control parameter.

In the clutch control device 60A, the ECU 60 calculates a clutch operation speed on the basis of an operation amount detected by the clutch lever operation amount sensor 4c, and varies the control state change determination value according to the clutch operation speed.

According to the configuration, since the control state change determination value is varied depending on the clutch operation speed (the lever operation speed), for example, even when the oil path pressure loss extent of the clutch operation system is affected, it is possible to vary the control state change determination value while considering the loss extent. For this reason, it is possible to accurately change the feedback control at the touch point at which it is switched whether the clutch device 26 performs the power transmission or not to perform the power transmission (i.e., switched between a connection state in which power transmission is possible and a disconnection state in which power transmission is not possible).

In the clutch control device 60A, the clutch capacity is controlled by the hydraulic pressure, the master cylinder 51 of the clutch actuator 50 and the slave cylinder 28 of the clutch device 26 are connected to each other via the hydraulic pressure pipeline, and the control parameter sensor (the downstream-side hydraulic pressure sensor 58) that is the slave hydraulic pressure sensor is disposed in the hydraulic pressure pipeline.

According to the configuration, it is possible to increase a degree of disposition freedom of the slave hydraulic pressure sensor, and even when the slave hydraulic pressure sensor and the slave cylinder 28 are disposed at places separated from each other, it is possible to accurately control the clutch capacity.

Further, the present invention is not limited to the embodiment, and for example, may be applied to a configuration in which the clutch is disconnected with an increase in hydraulic pressure and the clutch is connected with a decrease in hydraulic pressure without being limited to an application to a configuration in which the clutch is connected with an increase in hydraulic pressure and the clutch is disconnected with a decrease in hydraulic pressure.

The clutch operator is not limited to the clutch lever and may be a clutch pedal or other various operators.

The present invention is not limited to a saddle riding vehicle in which a clutch operation is automated like the embodiment and may also be applied to a saddle riding vehicle including a so-called clutch operationless transmission configured to adjust a driving force and shift gears without performing a manual clutch operation under a predetermined condition while setting the manual clutch operation as a basic operation.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A clutch control device comprising:
   an engine;
   a gearbox;
   a clutch device that disconnects and connects a power transmission between the engine and the gearbox;
   a clutch actuator that drives the clutch device and changes a clutch capacity;
   a controller that calculates a control target value of the clutch capacity;
   a control parameter sensor that detects a control parameter of the clutch capacity;
   a clutch operator that manually operates the clutch device; and
   a clutch operation amount sensor that converts an operation amount of the clutch operator into an electrical signal,
   wherein the controller sets a control target value of the clutch capacity according to the operation amount detected by the clutch operation amount sensor, executes feedback control so that the control parameter which is detected by the control parameter sensor approaches the control target value, and changes a method of the feedback control when the control parameter reaches a predetermined control state change determination value during the feedback control.

2. The clutch control device according to claim 1, wherein the controller performs the feedback control on the basis of an I term in a PID control before the control parameter reaches the control state change determination value, and performs the feedback control on the basis of a P term in the PID control after the control parameter reaches the control state change determination value.

3. The clutch control device according to claim 1, the clutch device connects the power transmission or disconnects the power transmission when the control parameter reaches the control state change determination value.

4. The clutch control device according to claim 1, wherein the controller calculates a clutch operation speed on the basis of an operation amount detected by the clutch lever operation amount sensor, and varies the control state change determination value in response to the calculated clutch operation speed.

5. The clutch control device according to claim 1, wherein the clutch capacity is controlled by hydraulic pressure, a master cylinder of the clutch actuator and a slave cylinder of the clutch device are connected to each other via a hydraulic pressure pipeline, and the control parameter sensor that is a slave hydraulic pressure sensor is disposed in the hydraulic pressure pipeline.

6. The clutch control device according to claim 5, wherein when the hydraulic pressure decreases the clutch capacity decreases and the clutch device is disconnected.

7. The clutch control device according to claim 1, wherein the clutch operator is a clutch lever, and the clutch operation amount sensor detects a pivot angle of the clutch lever.

* * * * *